US005950487A

United States Patent [19]
Maresca, Jr. et al.

[11] Patent Number: 5,950,487
[45] Date of Patent: Sep. 14, 1999

[54] GAUGE FOR MEASURING LIQUID LEVELS

[75] Inventors: Joseph W. Maresca, Jr.; Alan A. Burns; Eric G. Eckert, all of Mountain View, Calif.

[73] Assignee: Vista Research, Inc., Mountain View, Calif.

[21] Appl. No.: 08/710,654

[22] Filed: Sep. 20, 1996

[51] Int. Cl.⁶ .................................................... G01F 23/00
[52] U.S. Cl. ............................. 73/293; 73/311; 73/313; 73/319; 250/577
[58] Field of Search .......................... 73/293, 311, 313, 73/319; 33/706, 707, 708, 755, 762, 763, DIG. 3; 250/573, 574, 577; 235/460; 340/619

[56] References Cited

U.S. PATENT DOCUMENTS

| | | | |
|---|---|---|---|
| 2,685,797 | 8/1954 | Morschel | 73/319 |
| 3,558,861 | 1/1971 | Collins | 235/61.11 |
| 3,935,741 | 2/1976 | Zinsmeyer et al. | 73/313 |
| 4,014,015 | 3/1977 | Gundlach | 340/347 |
| 4,079,627 | 3/1978 | Gundlach | 73/313 |
| 4,589,282 | 5/1986 | Dumery | 73/313 |
| 4,625,549 | 12/1986 | Mahoney | 73/327 |
| 4,779,460 | 10/1988 | Cruickshank | 73/313 |
| 4,827,769 | 5/1989 | Riley et al. | 73/313 |
| 4,848,149 | 7/1989 | Fiorentino et al. | 73/293 |
| 5,054,319 | 10/1991 | Fling | 73/319 |
| 5,062,214 | 11/1991 | Gustafsson et al. | 33/706 |
| 5,245,874 | 9/1993 | Baer | 73/313 |
| 5,347,864 | 9/1994 | Senghaas | 73/313 |
| 5,483,831 | 1/1996 | Steiner | 73/313 |

FOREIGN PATENT DOCUMENTS

| | | | |
|---|---|---|---|
| 79412 | 5/1982 | Japan | 73/293 |
| 155720 | 9/1984 | Japan | 73/293 |
| 277935 | 11/1988 | Japan | 250/577 |
| 316615 | 12/1989 | Japan | 250/577 |

OTHER PUBLICATIONS

R.C. Stanley, "Anti–Crosstalk Code Reader", *IBM Tech. Disclosure Bulletin*, vol. 19, No. 9, Feb. 1999.

Primary Examiner—Hezron Williams
Assistant Examiner—Willie Morris Worth
Attorney, Agent, or Firm—David H. Jaffer

[57] ABSTRACT

An apparatus for measuring liquid level in a container, the apparatus having a flexible measurement scale attached at one end to a weight for retainment at the bottom of the container and at the opposite end to a receiver at the top of the container. A float moves along the flexible scale, and has a configuration and density designed to place a portion of the float below the level of the liquid to be measured and a portion above the liquid level. The portion above the liquid level contains transmitter apparatus for applying energy to one side of the scale, and detection apparatus on the other side for detecting energy transmitted through the scale and converting it to a liquid level in the container. The accuracy of readings is enhanced through the use of a wide gap between the scale and float at the liquid-air interface for reducing surface effects between the float and the scale, and through the use of a special two-dimensional vertically offset gray scale code that allows for the use of a more narrow scale and larger spacing between components.

23 Claims, 15 Drawing Sheets

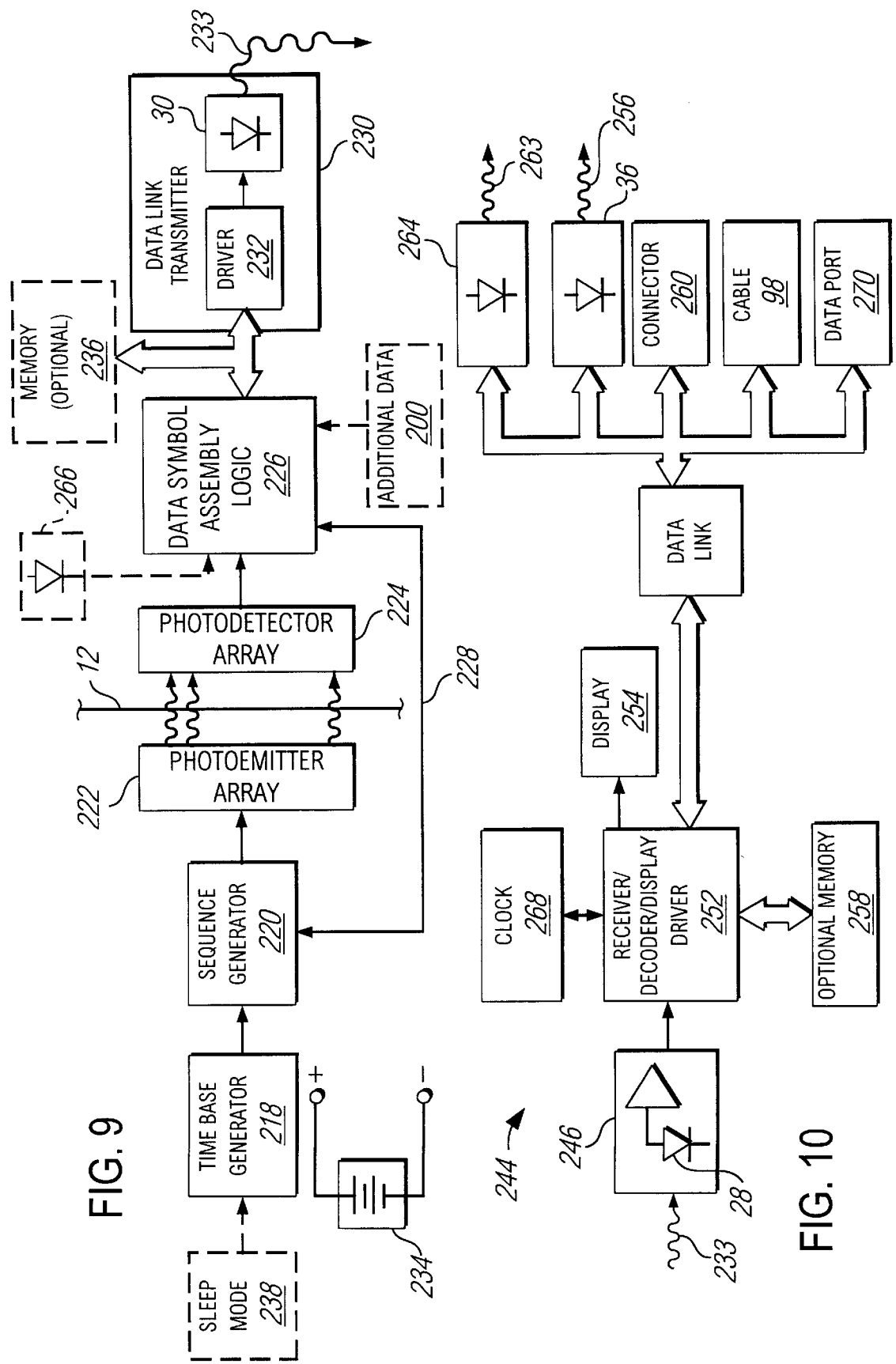

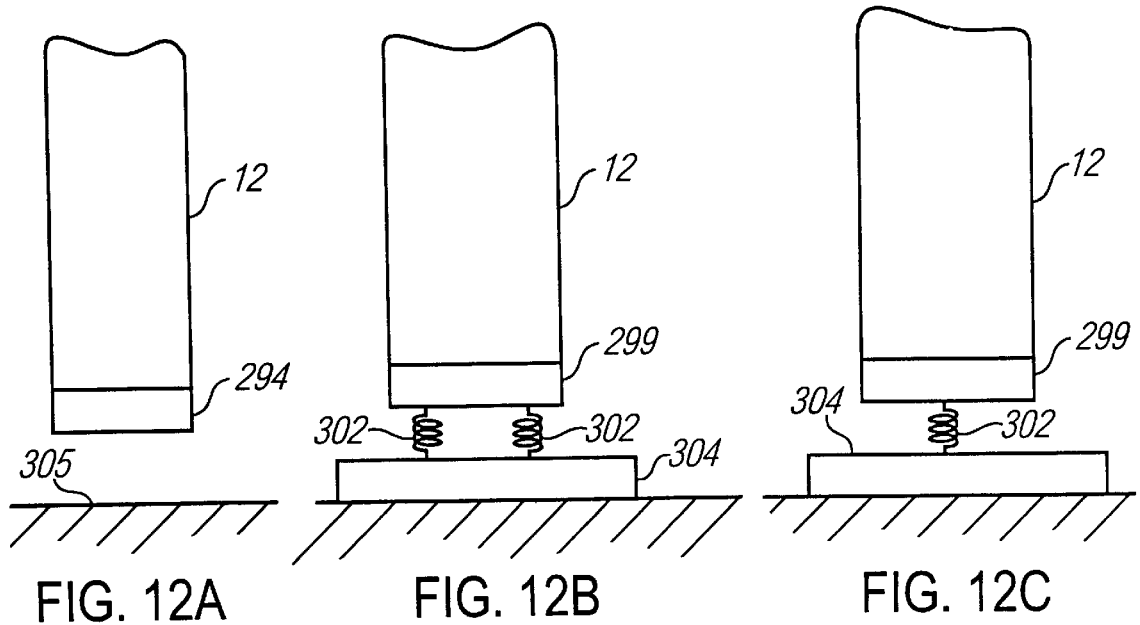
FIG. 12A  FIG. 12B  FIG. 12C
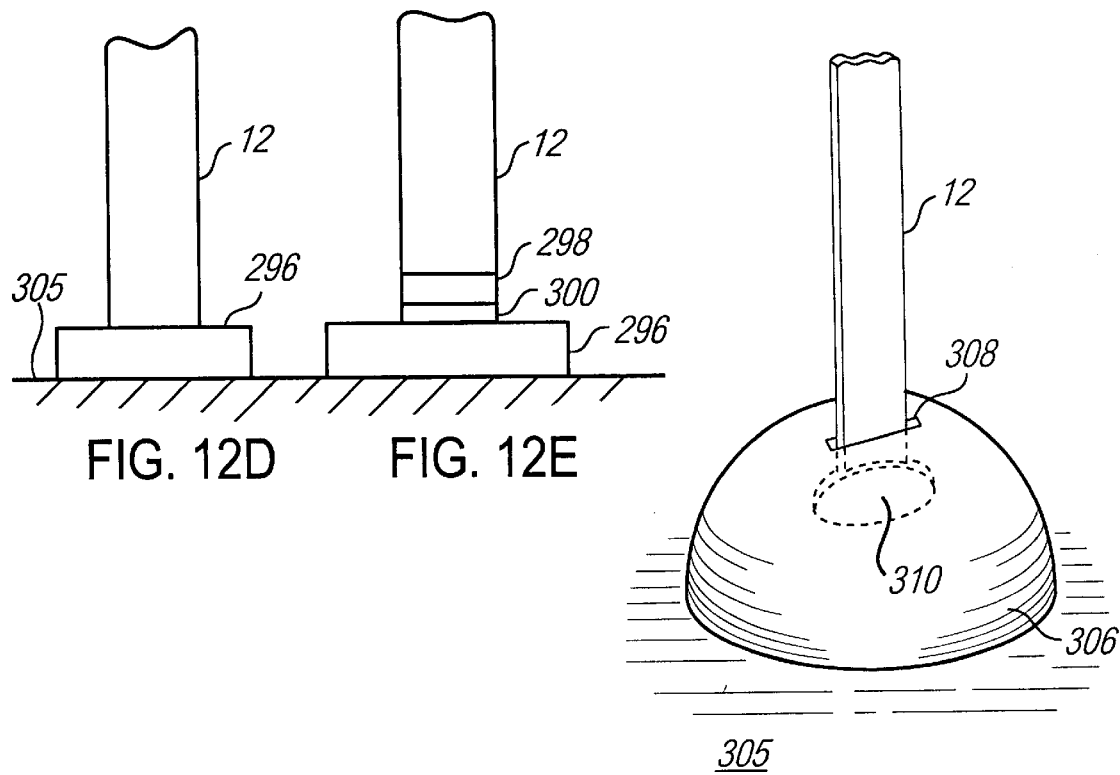
FIG. 12D  FIG. 12E
FIG. 12F

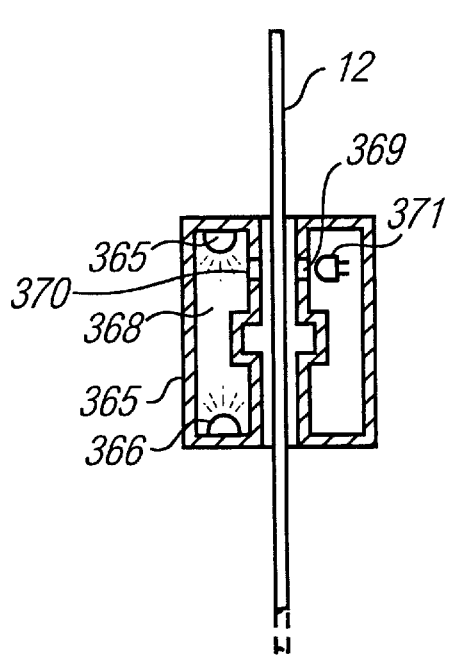
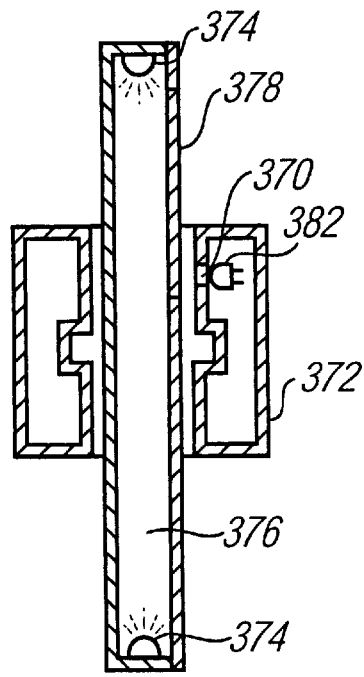
FIG. 14    FIG. 15
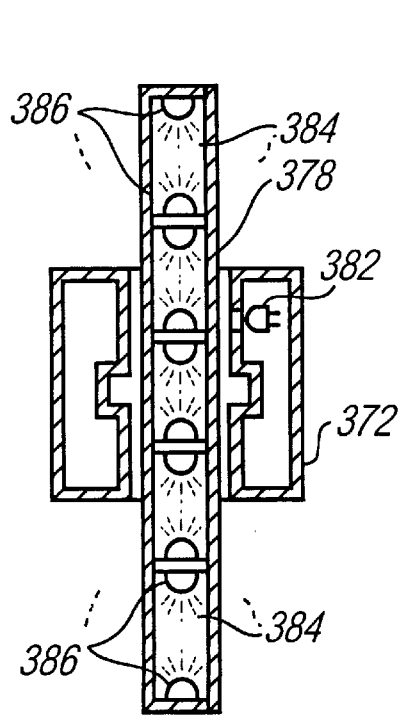
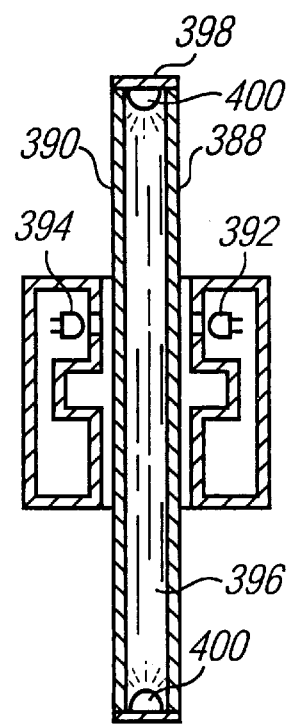
FIG. 16    FIG. 17

GAUGE FOR MEASURING LIQUID LEVELS

BACKGROUND OF THE INVENTION

1. Field of the Invention

The present invention relates to apparatus for measuring the level of liquid, and more particularly to an apparatus wherein a liquid level is indicated by the position of a float relative to a scale, determined by transmission and detection of a radiated signal through the scale.

2. Brief Description of the Prior Art

There are a number of sensors and sensor systems to measure liquid levels. There is currently a need for lower cost sensors and sensor systems, particularly for the storage tank marketplace, that can be used for inventory management without sacrificing accuracy, reliability or functionality. The most common types of level measurement systems use floats.

In one type of system, the float is suspended by a cable from a circular storage reel located at the top of a liquid container. An optical reader is used to measure how much cable is rolled in or out from the reel. Such a system is described in U.S. Pat. No. 3,558,861 by Collins. This type of system has a number of mechanical drawbacks that affect both accuracy and reliability. One such drawback is the need for a motor and tensioning system to ensure that the tape not interfere with the movement of the float and yet accurately reflect the distance from the float (liquid level) to the optical reader.

An improved system is described in U.S. Pat. Nos. 4,014,015 and 4,079,627 by Gundlach. This system uses a rigid vertical member with a float allowed to freely move up and down with the level of the liquid. The vertical member has a number of electrical sensors, each representing a discrete location along the vertical member. The sensors interact magnetically with the float to produce a signal in the sensor indicative of float position. This system is structurally complicated because of the large number of sensors required for implementation.

Another apparatus using either optics or magnetics to determine the float position relative to a vertical member is described in U.S. Pat. No. 5,483,831 by Steiner. The magnetic implementation includes a series of horizontal binary coded bits for each linear division along the member length. Each division has magnetic and non-magnetic areas that are read by a horizontal array of magnetic reading sensors mounted on one side of the float. The optical implementation uses a series of horizontal binary coded bits for each linear division, each horizontal series having reflecting and non-reflecting areas that are read by an array of photo emitters and detectors mounted on the same side of the float. Each coded bit has a corresponding emitter and detector, and the distance between them and the reflecting element must be tightly controlled for accurate liquid level measurement. In order to accomplish this control, a special guide is required to align the float with the vertical member. The guide assures that the float reading head is at a fixed distance from the horizontal binary coded scale. One disadvantage of the Steiner device is that it is mechanically complex. Another disadvantage of the Steiner device is the possibility of contamination of the code when in operational use, which affects the reflections and degrades performance. Contaminants can also cause friction in the close fitting guide system, impeding the motion of the float and causing reading errors. In addition, since the optics of Steiner are located within the liquid, any liquid-surface anomalies can also cause refraction errors.

There are a large number of applications for the present invention, particularly those applications in which a simple, accurate, reliable and inexpensive sensor system is required to measure liquid level. The present invention can be used for measuring the level of any kind of liquid in any kind of manmade or natural containment system, including, for example, underground and aboveground fuel and chemical storage tanks, water tanks and various types of manmade and natural water containment systems, groundwater monitoring wells, and liquid-waste tank systems. This invention can also be used in manufacturing or processing systems and various types of instrumentation and measurement systems requiring liquid-level measurements. The present invention can be used in both pressurized and unpressurized containment systems and in both open and enclosed containment systems. While the main purpose of the present invention is to measure the level of a liquid over a range of depths, the same invention has applications as a level switch, which indicates that the level has reached a certain depth, and in applications where the change in level is required (e.g., leak detection applications). Also, the present invention can also be used to measure the level of the interface between two immiscible liquids.

The present invention is motivated by and fulfills the current market need for an inexpensive and functionally robust apparatus that has the accuracy to measure the level of liquid in underground storage tanks containing petroleum fuels and hazardous substances that will satisfy (1) the operational and regulatory requirements for inventory management, control and reconciliation and (2) the regulatory requirements for leak detection. While motivated by this application, some of the other applications are equally important and require the same type and accuracy of level measurements.

The regulatory requirements for inventory measurements specify that liquid level should be measured daily with an accuracy of $\frac{1}{8}$ in., or better; this level of accuracy also addresses satisfactorily those inventory measurements used only for operational considerations and for leak detection using statistical inventory reconciliation (SIR) methods. SIR methods have been developed recently that can accurately detect small leaks in underground storage tanks using level or inventory data collected over a long period of time (e.g., a month). This method of leak detection can be implemented using the stick measurements typically used for inventory measurements in underground storage tanks. However, inexpensive application of this leak detection method requires "accurate and reliable" inventory level measurements, which are difficult to obtain using stick measurements. Stick measurements are difficult to use because they are typically filled with operator reading and recording errors. Automatic tank gauges (ATGs) can be used for making the level measurement required for inventory control and for SIR. However, ATGs are more expensive than required, because these systems also have the high level of precision required to measure very small level changes (e.g., typically 0.001 in.) and a means for thermal compensation of the liquid that is needed for conducting a leak detection test over a short time period (e.g., typically several hours to a day).

SUMMARY OF THE INVENTION

It is therefore an object of the present invention to provide an improved apparatus for the measurement of liquid level.

It is a further object of the present invention to provide an improved apparatus for the measurement of the level of the interface between two immiscible liquids.

Another object of the present invention is to provide a low cost apparatus for the measurement of liquid level.

Another object of the present invention is to provide a mechanically simple and reliable apparatus for the measurement of liquid level.

Another object of the present invention is to provide an apparatus for the measurement of liquid level with a code that is implemented at discrete positions along the applicable length of a vertical scale in such a way as to allow one state of the code to be read by transmission of energy through the coded scale and one state of the code to be read by blocking transmission of energy through the coded scale.

Another object of the present invention is to provide an accurate, functionally robust optical apparatus for the measurement of the level of the liquid in an environment where the optical code is subjected to staining, residue, dirt, and other types of contamination.

Another object of the present invention is to provide a data link to communicate a liquid level signal from the float system to one or more separate electronic devices for processing, storage and/or display.

Briefly, a preferred embodiment of the present invention includes an apparatus for measuring liquid level in a container. The apparatus has a flexible measurement scale, attached at one end to a weight for retainment at the bottom of a container, and at the opposite end to a receiver at the top of the container. The float moves along the flexible scale, and has a configuration and density designed to place a portion of the float below the level of the liquid and a portion above the liquid level. The portion above the liquid level, in a preferred embodiment, contains transmitter apparatus for applying energy to one side of the scale, and detection apparatus on the other side for detecting energy transmitted through the scale and converting it to a detected signal indicative of a particular code on the scale and of the liquid level in the container. The float has a data link transmitter for sending the detected signals to the receiver at the top of the container. The receiver contains either a display read-out of the liquid level, or in an alternate embodiment functions as a transceiver for sending the signal to a remote display unit. The accuracy of readings is enhanced through the use of a wide gap between the scale and float at the liquid-air interface for reducing surface tension effects between the float and the scale, and through the use of a special two-dimensional vertically offset gray scale code that allows for the use of a more narrow scale and larger spacing between components.

An advantage of the present invention is that it provides a less expensive liquid level measurement apparatus, constructed from low cost components.

A further advantage of the present invention is that it can operate in a relatively contaminated, dirty environment because of the use of transmission of energy for reading the vertical scale.

Another advantage of the present invention is that it provides a simple inexpensive method of reducing scale to float surface tension at the liquid-air interface.

A further advantage of the present invention is that due to low power consumption, it can be implemented at remote locations using only batteries to power the float and receiver/transceiver.

Another advantage of the present invention is that it can operate with a large range of sizes and types of containers due to the flexible nature of the vertical measurement scale.

Another advantage of the present invention is that it can operate in uncontained bodies of liquid.

IN THE DRAWING

Figure 7:
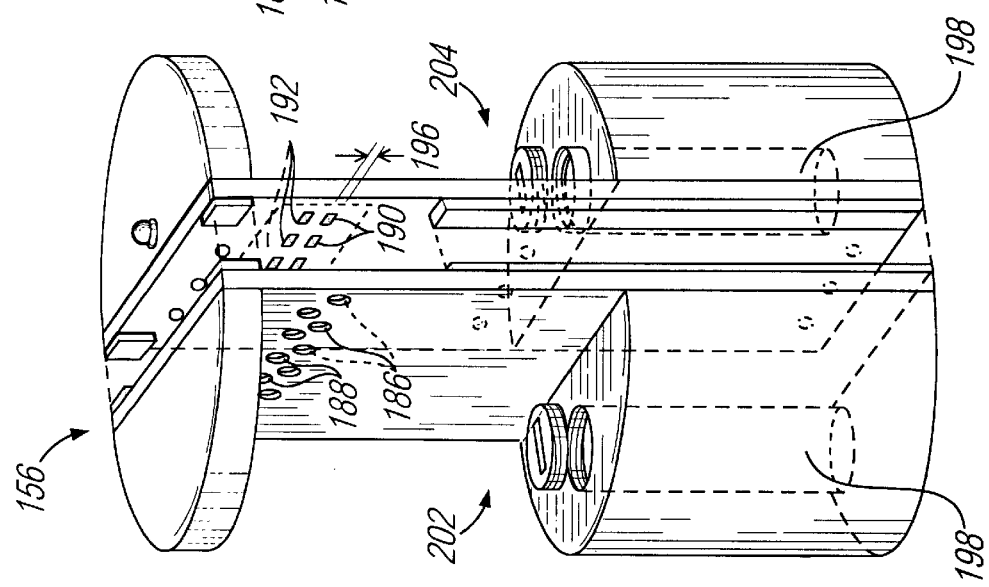

FIG. 7 clarifies details of the float housing.

Figure 8:
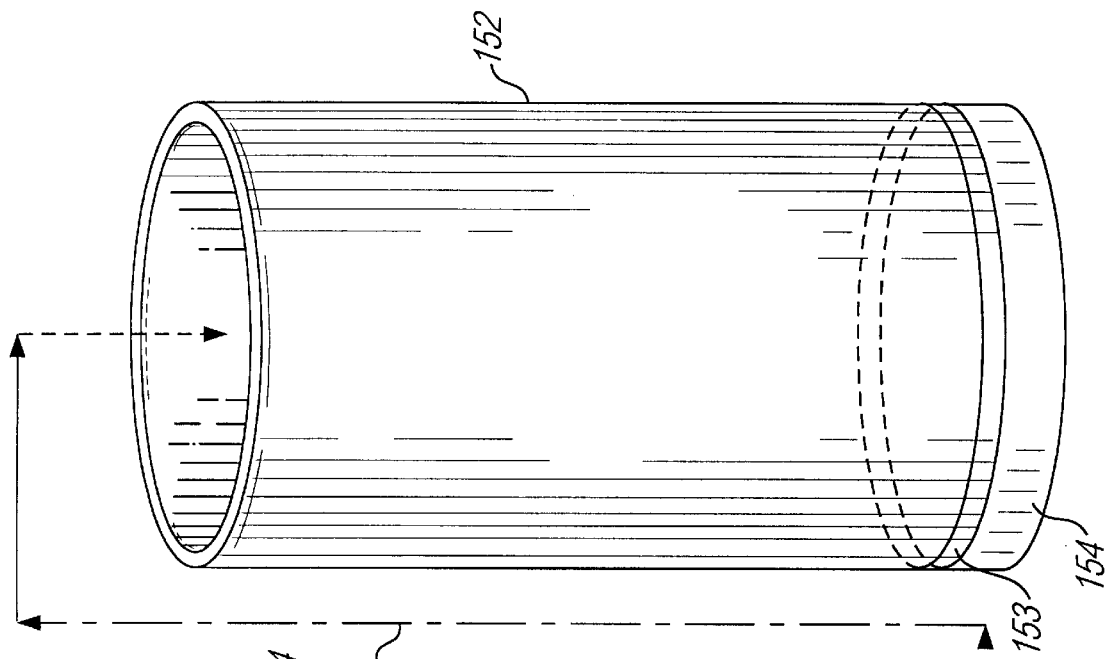

FIG. 8 is an exploded assembly view of the float.

FIG. 9 is a block diagram of the float circuitry.

FIG. 10 is a block diagram of the receiver/transceiver circuitry.

FIGS. 11A–11D show various ways of receiving and displaying or relaying the level of the liquid in an underground storage tank.

FIGS. 12A–12E show various ways of attaching the scale to the bottom of a container.

FIG. 12F illustrates a weighted scale flexibly captivated in a base.

FIGS. 13A–13E show the use of scale support structures.

FIG. 14 shows the use of an alternative light source in the float.

FIG. 15 shows a light source in a scale support structure.

FIG. 16 shows the use of multiple isolated light sources in a scale support structure.

FIG. 17 shows the use of two scales with the light source in a scale support structure.

Figure 18:
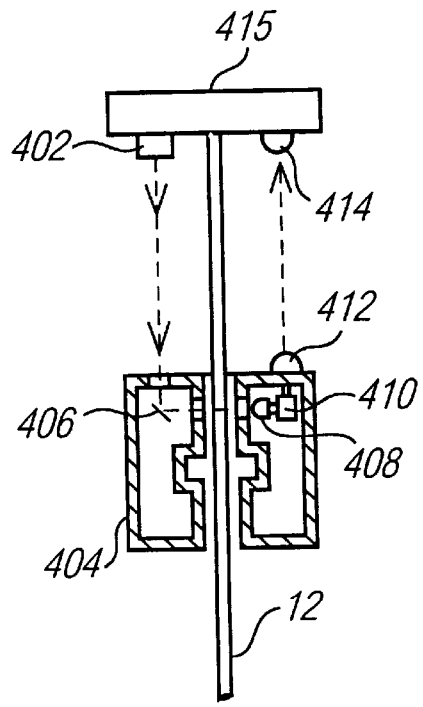

FIG. 18 illustrates a light source located at the top of a liquid container.

Figure 19:
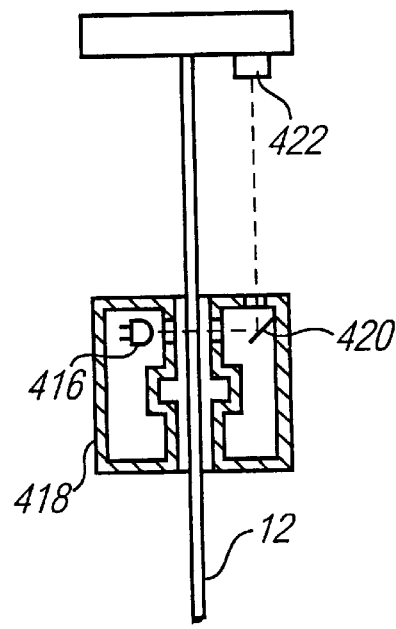

FIG. 19 shows an embodiment with a light source in the float and the light detector at the top of the container.

Figure 20:
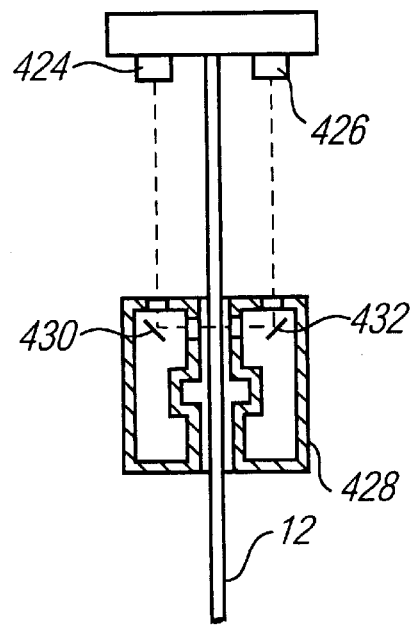

FIG. 20 shows both the light source and detector at the top of the container.

Figure 21:
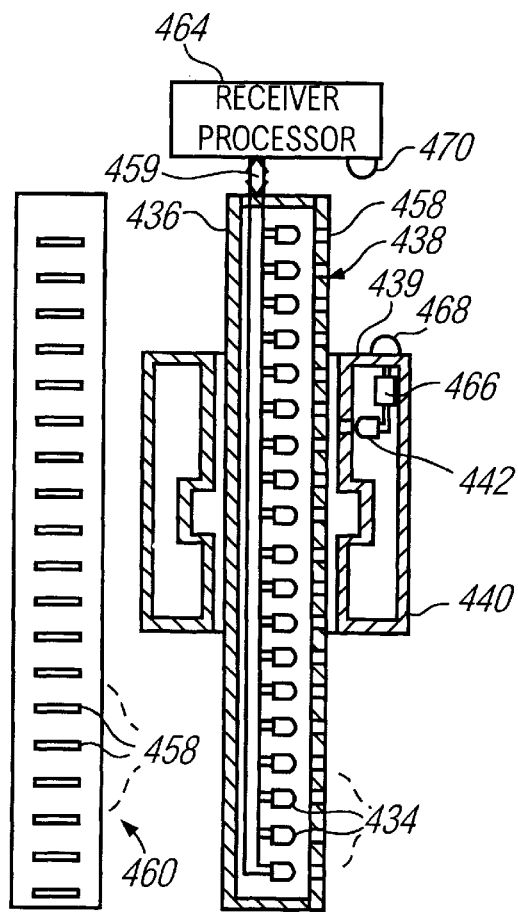

FIG. 21 shows a scale with a single bit per vertical increment, and an embodiment to read the scale with one detector per bit, and a single emitter in the float.

Figure 22:
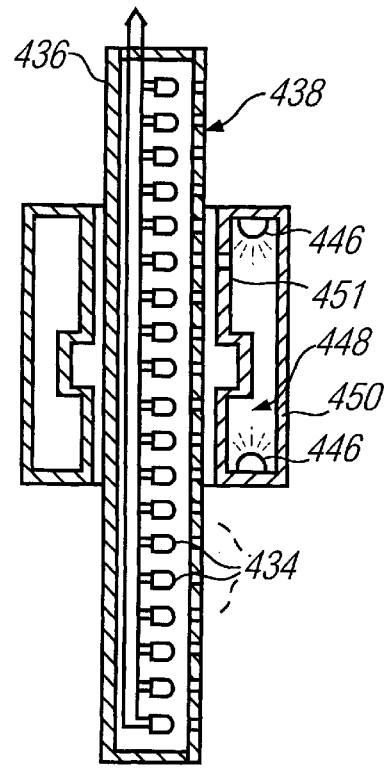

FIG. 22 shows the apparatus of FIG. 21 with an alternate light source in the float.

Figure 23:
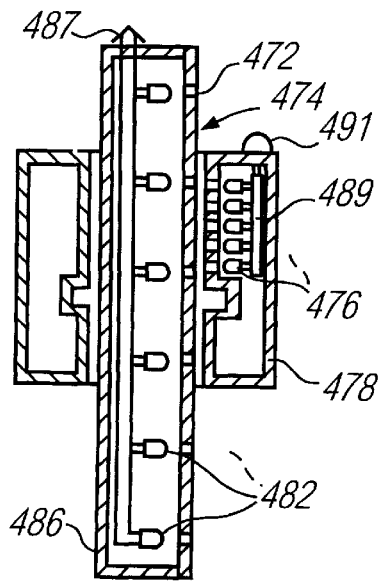

FIG. 23 shows an embodiment using spaced apart single bits in the scale and multiple emitters in the float with a spacing between each emitter equal to one bit, and multiple detectors in the scale with a spacing between each detector one bit larger than the sum of the spacings between all of the emitters in the float.

Figure 24:
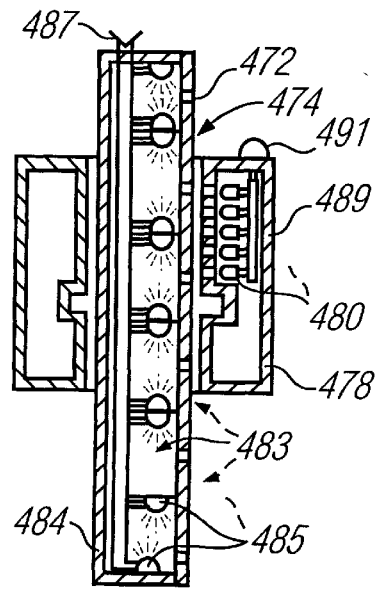

FIG. 24 shows an alternative scale light source for the embodiment of FIG. 23.

DESCRIPTION OF THE PREFERRED EMBODIMENT

Figure 1A:
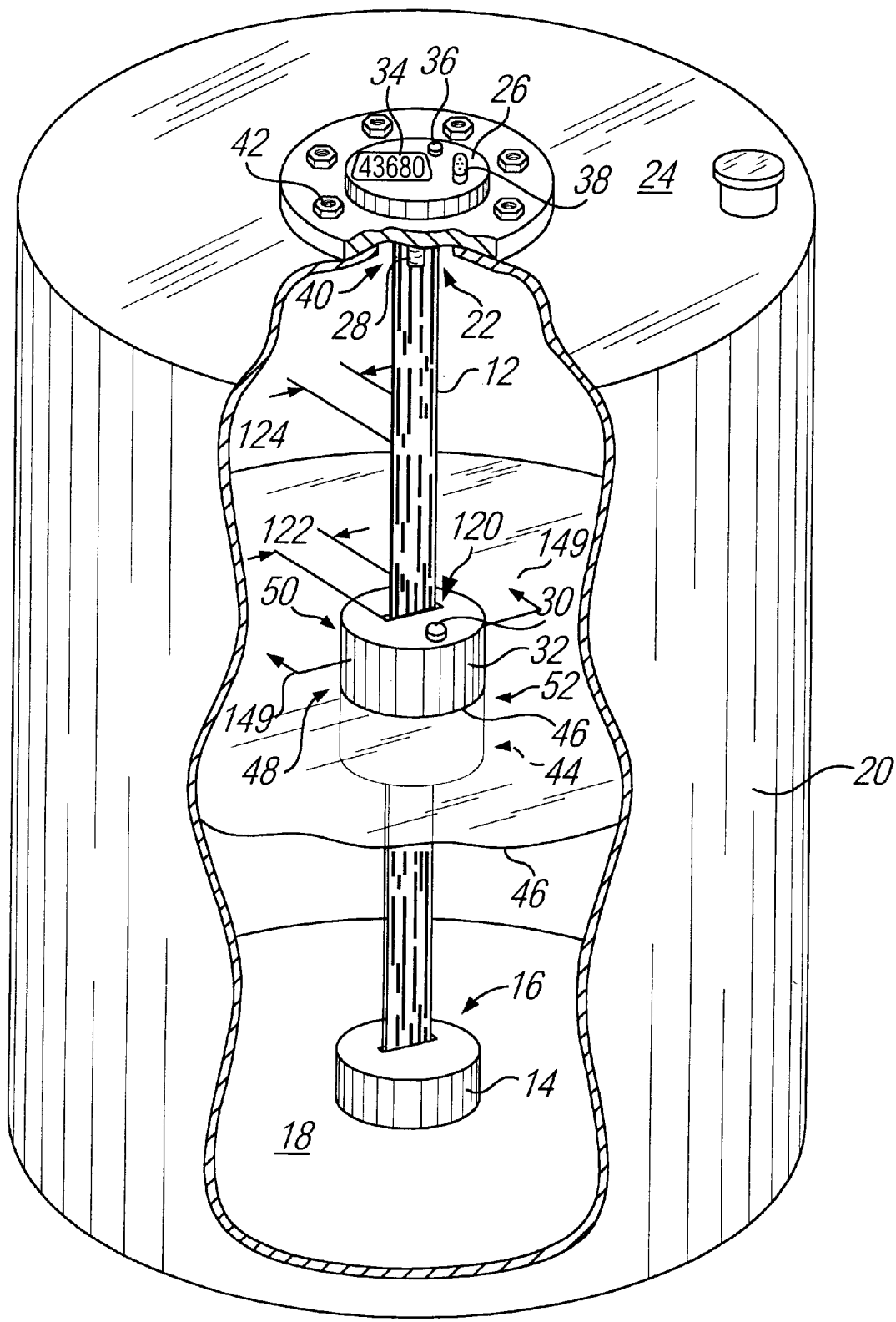
FIG. 1A illustrates the liquid level measurement gauge installed in a container.

Referring now to FIG. 1A of the drawing, a preferred embodiment of an inventory tank gauge 10 according to the present invention is shown to include a flexible scale 12 attached to a weight 14 for retaining the distal end 16 of the scale 12 near the bottom 18 of a container 20. The opposite proximal end 22 of the scale 12 is shown attached near the top 24 of the container 20. FIG. 1A shows the scale attached to a receiving unit 26, secured to the top 24. The unit 26 has an infrared (IR) detector 28 for receiving a liquid level measurement signal from an IR transmitter 30 on the float 32.

The receiving unit 26 preferably processes the detected measurement signal and outputs a number indicative of the liquid level on a display 34. Alternatively the unit 26 can relay the detected measurement signal by way of an IR transmitter or any radiated signal emitter 36 to a remote display unit, or it can output the signal to a cable either directly or through a connector 38. The unit 26 can include any combination of the above display and/or signal relay features as required by a particular application. An alternative construction of unit 26 allows mounting the main portion of unit 26 at any convenient location, as long as the detector 28 is mounted as shown above the emitter 30. In order to maximize the transfer of the measurement signal from the emitter 30 to the detector 28, the emitter 30 and detector 28 should be on the same side of the scale 12.

Alternatively, the receiving unit 26 can include a memory for the purpose of storing measurement data for transmission at a later time. The receiver 26 as shown, is mounted over or through a hole 40 in the top 24 of the container by way of bolts 42. These features will be more fully described in the following specification.

The float 32 is preferably designed with a configuration and buoyancy so as to have a lower portion 44 below the liquid level 46 and an upper portion 48 above the liquid level. In the preferred embodiment, a first side 50 of the float 32 contains light emitter apparatus and an opposite second side 52 contains light detection apparatus for detecting light transmitted through the coded scale 12. The link emitter or IR transmitter 30 radiates a signal containing the liquid level measurement data to the IR detector 28.

As noted above, the preferred embodiment uses light as the transmitted signal from the transmitter in the float through the scale. Light is also preferred for transmission from the float 32 to the receiving unit 26. Alternative embodiments of the emitters and detectors in or on the float of the present invention include the use of a magnetic field, electric field, electromagnetic field, sound and heat. Those skilled in the art will be able to fabricate a device using these various energy types after reading the specification of the present invention.

Figure 1B:
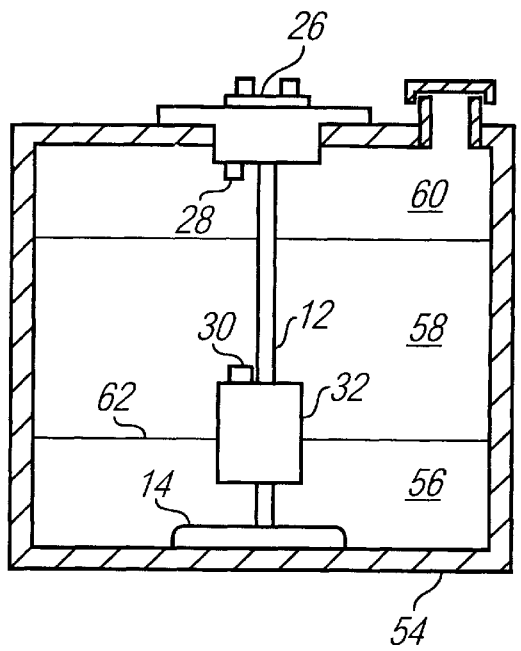
FIG. 1B illustrates a float for use in measuring a liquid-liquid interface level.
Figure 1C:
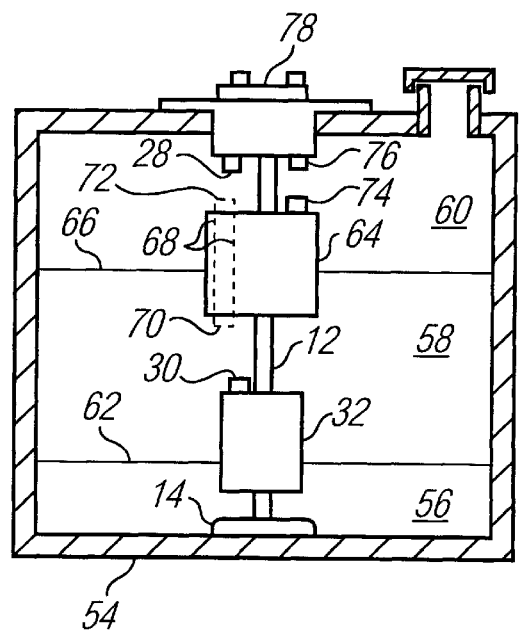
FIG. 1C shows a system using two floats to measure both a liquid-liquid interface level and a liquid-air level.

FIGS. 1B and 1C are cross sectional views of a container 54 with two alternate embodiments of the present invention. FIG. 1B shows the container 54 with a first heavier liquid 56 and a second lighter liquid 58, above which there is air 60. The float 32 is adjusted in buoyancy to remain at the liquid-liquid interface 62.

In FIG. 1C, a second float 64 is added with its buoyancy adjusted to remain at the liquid-air interface 66. Transmitter 30 of float 32 transmits a measurement signal indicative of the level of the liquid-liquid interface 62. The signal must pass by or through the second float 64. One way of achieving this is to simply make float 32 larger in diameter than float 64 and place the transmitter 30 near the edge. Other ways are illustrated in FIG. 1C as dashed lines 68 indicating a clearance through float 64 to allow passage of the signal from float 32 to the detector 28. Another way is to place a detector 70 on the bottom of float 64, and then put electronics in float 64 to relay the signal via a second transmitter 72 to detector 28. Float 64 contains apparatus similar to float 32 for measurement of the liquid-air interface. The measurement signal data is transmitted by emitter 74 on float 64 to detector 76 on the receiver 78. In this case, the receiver 78 contains apparatus for displaying or relaying the level measurement data of both interface 62 and level 66.

Figure 1D:
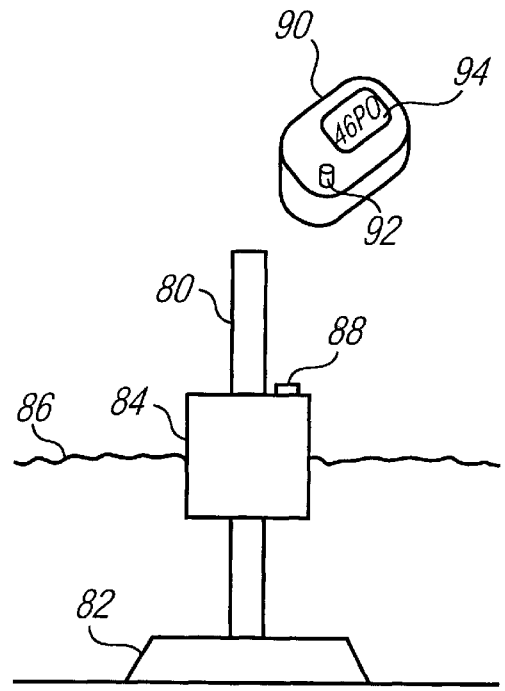
FIG. 1D shows a rigid scale mounted on a base for measuring liquid level when a container top is not present or available for use.

FIG. 1D illustrates an alternate embodiment for use in circumstances where a container top is not possible or practical. The embodiment shows a rigid scale 80 securely mounted to a base 82. A float 84 is set in buoyancy to remain at the liquid-air interface 86. In this case, the float has a transmitter 88 for radiating measurement data to a preferably hand held remote located receiver 90 which includes detector 92 and preferably a measurement display 94.

The apparatus of FIG. 1D can also be constructed with a flexible scale, but the scale would then need a support structure which could take on many forms known to those skilled in the art after reading this specification. Examples of support structures for use with a flexible scale will be disclosed in the following specification referring to the figures of the drawing.

Figure 2:
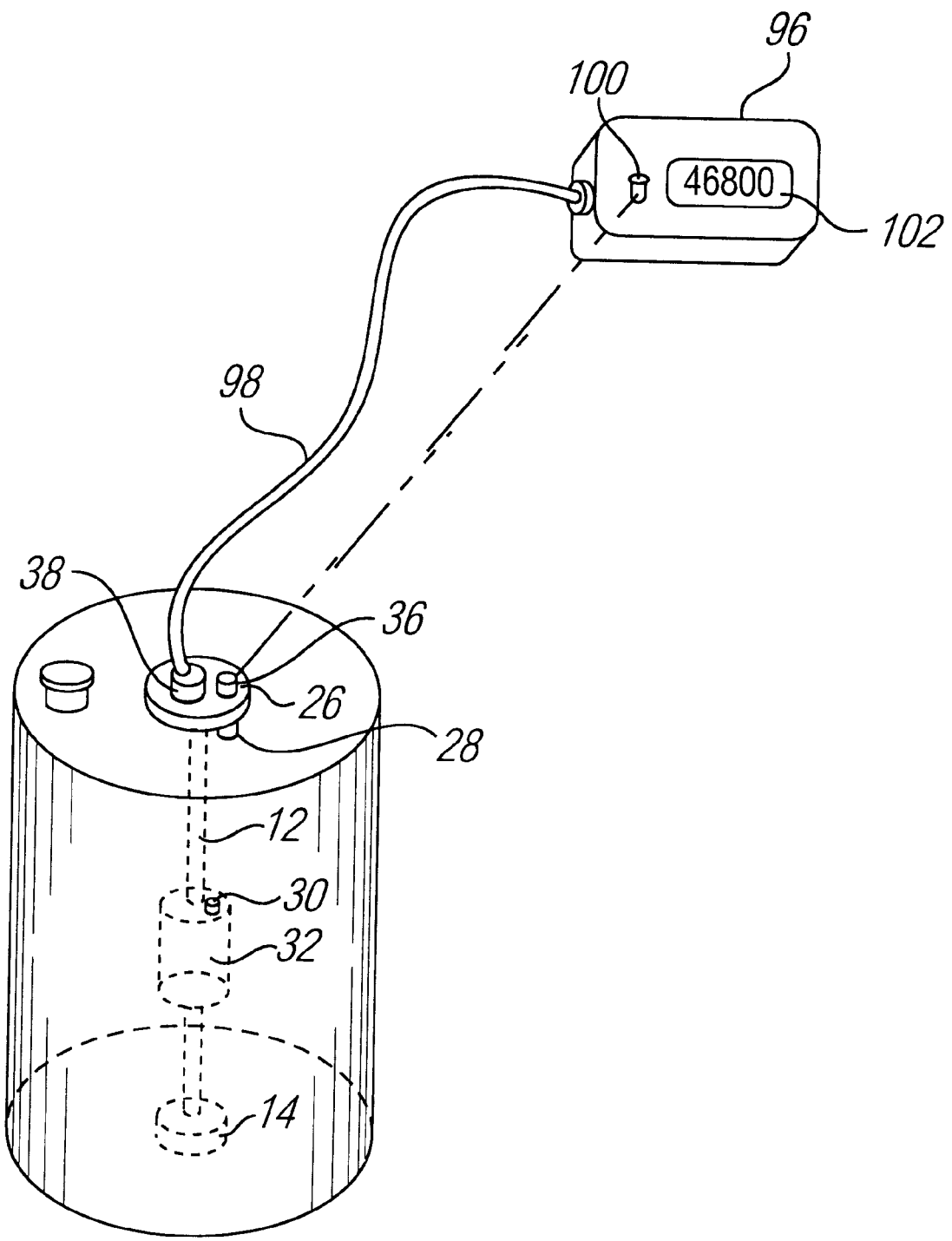
FIG. 2 illustrates transmission of measurement data to a remote display unit.

FIG. 2 provides further illustration of the use of a remote display unit 96 with the apparatus as illustrated in FIG. 1A for receiving and displaying liquid level measurement signals either from the receiving unit 26 by way of an IR transmitter 36 on the receiving unit 26 and an IR detector located on the remote unit or by way of a cable 98 from the receiving unit 26 or via a connector 38 on the receiving unit 26. The display unit 96 includes an IR detector 100 and a display 102.

The present invention is meant to include various locations and methods of attachment of the receiver 26. Alternate construction methods will be apparent to those skilled in the art after reading the specification of the present application, and these are included in the spirit of the present invention. In addition to variations in the "receiver" 26 unit, other constructional variations are also included in the present invention. For example, the weight 14 is only one of many ways of attaching the distal end of the scale to the container 20. The proximal end 22 can also be attached by other methods. The structure of FIG. 1 serves as a simple example. Methods of attachment to the bottom of a container will be disclosed in the following specification.

Figures 3A, 3B, 3C:
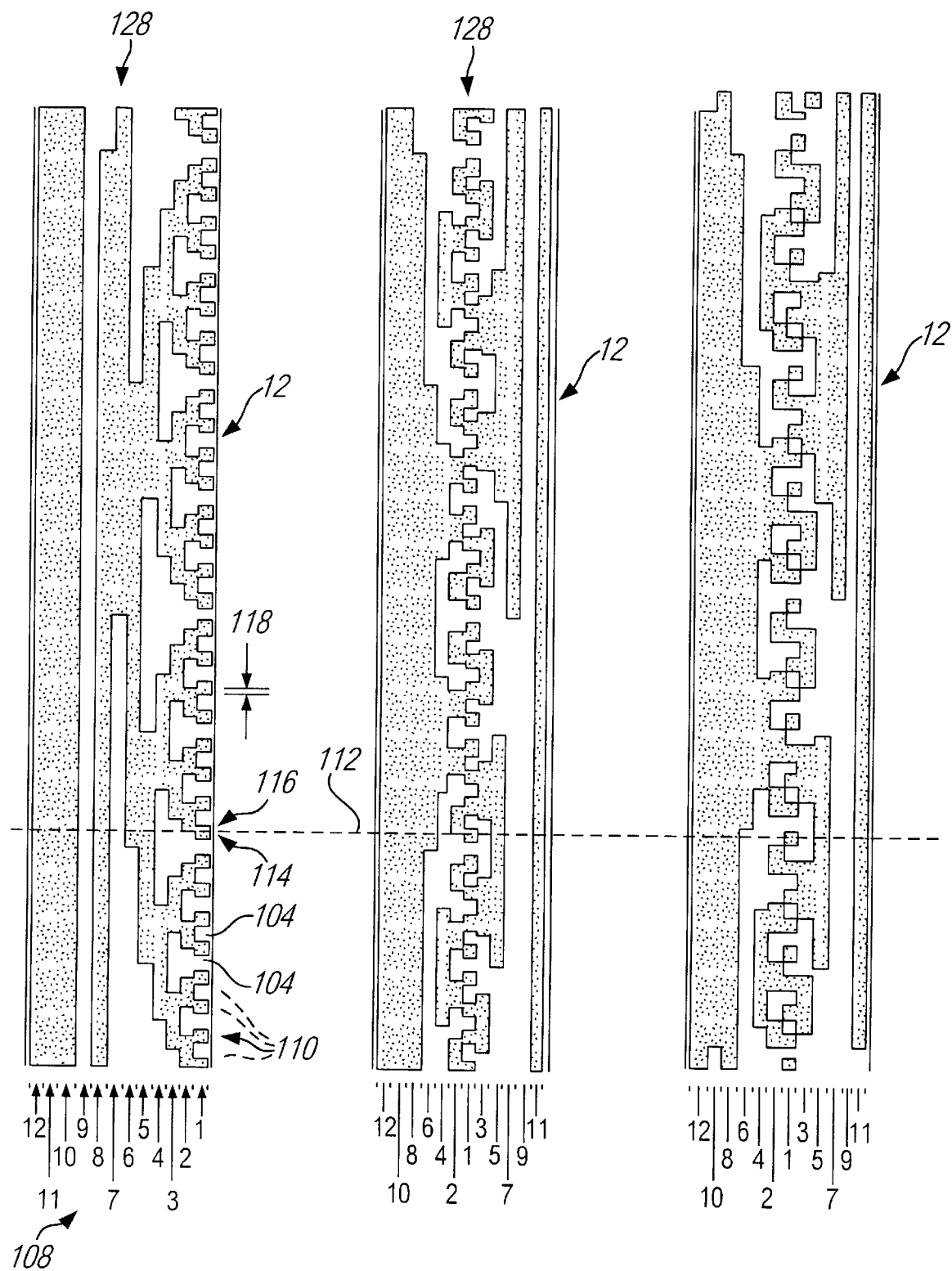
FIGS. 3A, 3B and 3C show preferred embodiments of measurement scale code.

A preferred embodiment of the code on the vertical measurement scale 12 is illustrated in FIGS. 3A, 3B, and 3C. The light areas 104 represent transmissive areas on the scale 12, and the dark areas 106 represent non-transmissive areas on the scale 12. For an optical tape, the preferred embodiment of the present invention, the transmissive areas are translucent to light and the non-transmissive areas are opaque. At the bottom of each of the three figures, each of 12 columns 108 is numbered. Each of the rows 110 represents a binary number used for identification of the float position relative to the scale. For example, dashed line 112 extends along a boundary between two rows 114 and 116. Each row 110 has a height indicated by 118. Transmission of energy through the scale (a light area) is represented by a binary "0". Blockage of energy (a dark area) is represented by the opposite, i.e. with a binary "1" respectively. The value (1 or 0) of the area in column 1 represents the lowest binary digit and in column 12 represents the highest. For example, an examination of row 114 in FIG. 3A reveals the binary number 000101001110 (334 decimal).

Figure 4:
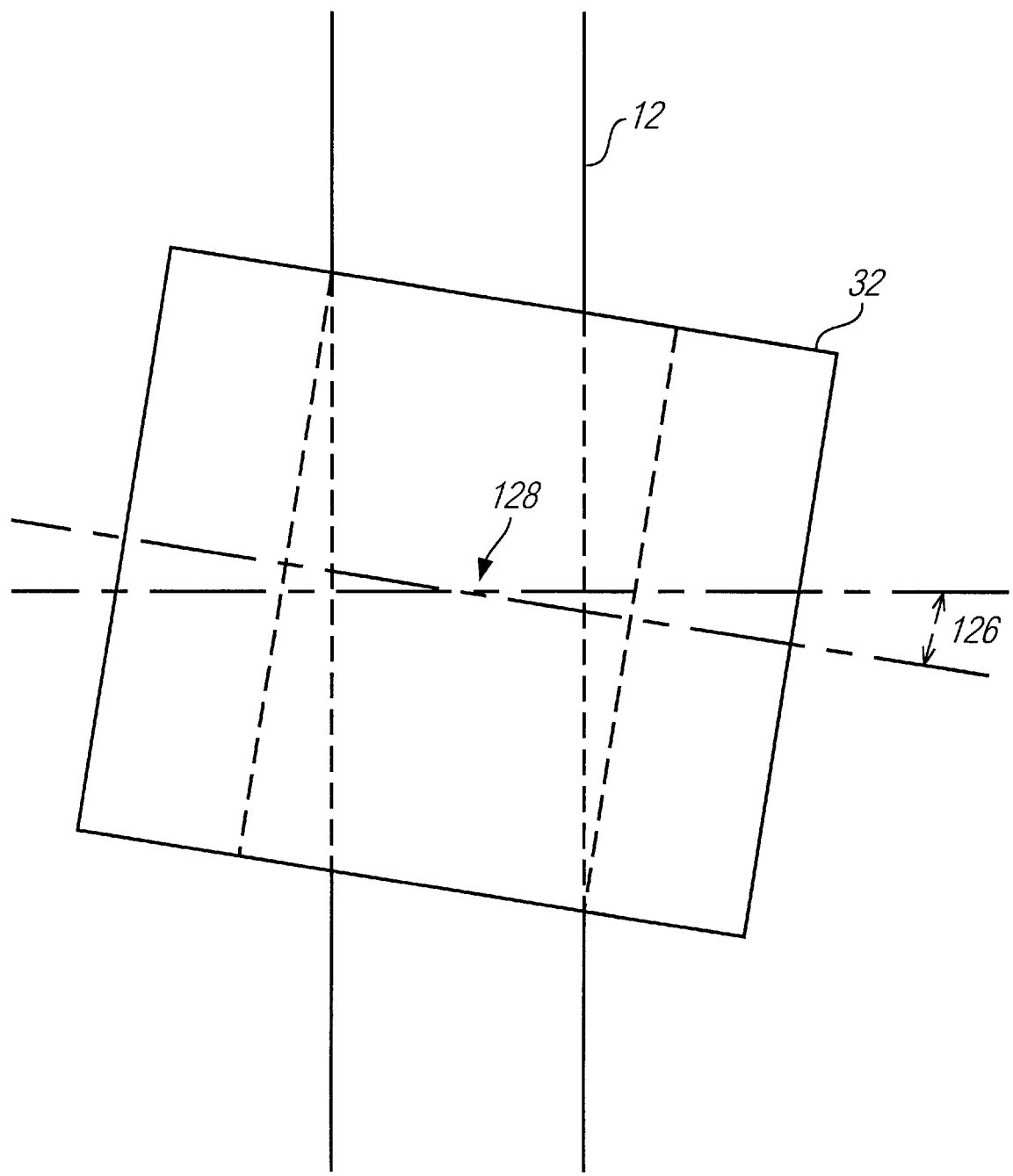
FIG. 4 is used to demonstrate the effect of tilting the float on measurement accuracy, and the desirability of rearranging the code columns.

Referring for a moment back to FIG. 1A, the float 32 is shown to have a slot 120 through its length for passage of the scale 12. The width 122 is slightly greater than the width 124 of the scale 12. The float 32 can therefore rotate slightly relative to the scale 12. FIG. 4 is an exaggerated and simplified view of the float 32 of FIG. 1A, illustrating the float 32 rotated in the clockwise direction. The rotation angle 126 is exaggerated to illustrate a principle. The emitters and detectors in the float (not shown) rotate with the float. They are arranged in a horizontal row, with the emitters radiating in a direction perpendicular to the scale 12. The emitters and detectors farthest away from the center 128 of the scale 12 suffer the greatest deviation from a horizontal line 130 and therefore the largest deviation from the horizontal row position. The greatest potential error exists with rows that have adjacent digits that change value from one row to the next, thereby being more susceptible to error due to light overlapping as a result of the tilt of the float. In order to minimize this kind of error, the columns containing rapid changes from dark to light as the column progresses from row to row, can be placed in a position on the scale that changes the least relative to the float as the float rotates. The positions on the scale that change the least with float rotation are those positions closest to the center 128. An examination of FIG. 3A shows that the most rapid changes from one row to the next occur in columns containing the least significant bits i.e., columns 1, 2, 3.

In order to minimize the chance of an erroneous reading, the columns in FIG. 3A are rearranged, with the low column numbers e.g. columns 1, 2 and 3 placed closest to the center 128, and the largest column numbers e.g. columns 12, 11, 10 placed near the outside of the scale 12. This is illustrated in FIG. 3B with the smallest column numbers 1, 2, etc. near the middle and the largest 12, 11, etc. near the outside.

The vertical measurement resolution is determined by the height 118 of each row. In the scale illustrated in FIGS. 3A, 3B and 3C, this height is 0.05 inches. A 12 bit code provides a maximum digital value of 4096, for definition of 4096 possible rows. Thus, if the height of each row is 0.05 inches, the scale can be approximately 204.8 inches, or about 17 feet long to accommodate liquid level depths up to that amount. It is also desirable for some applications to limit the width of the scale. Greater depths can be accommodated by adding bits. This may be done by increasing the width of the scale, or reducing the width of each bit.

One problem in constructing a narrow scale is the size of the light emitters and detectors. Lining up all of the emitters/detectors in a row is a simple, uncomplicated construction, but the minimum width of the scale (and float) is then limited by the size of the emitters and detectors. This problem is solved by using other construction layouts. One possible layout involves placing every other emitter/detector in a second row, spaced apart from the first row by a number of rows equal to or greater than the maximum dimension of the emitter or detector, whichever is greater. This requires a rearrangement of the code on the scale 12, achieved by vertically shifting every other column the required amount. For example, if the elements (emitters and detectors) need to be spaced apart by 0.075 inches, every other column could be shifted up one and one-half rows, providing 1.5 times 0.05 inches or 0.075 inches spacing between the elements in the vertical direction. An example of vertically shifting every other column is shown in FIG. 3C which has the same column arrangement as FIG. 3B, except every other column has been shifted vertically one and one half rows. For further narrowing of the scale, the elements can be placed in three or more rows, requiring corresponding vertical shifts in the columns. This vertical column shifting, multi-row approach, has the advantage of allowing the use of off-the-shelf emitters/transmitters and detectors that are too large to fit in a single horizontal row to read the code. This is important if the float is to fit into small access openings into a tank or container such as a two inch diameter storage tank access opening. The code used in FIGS. 3A, 3B and 3C is an example of what is known as a gray code, which has the feature that only one bit changes from number to number, e.g., row to row (FIG. 3A). Changing only one bit with each vertical increment (row) on the scale, is a condition found to be advantageous in achieving a reliable system.

The particular code illustrated in FIGS. 3A, 3B and 3C is given as an example of the preferred embodiment. Other codes can also be used in the present invention.

Figure 5A:
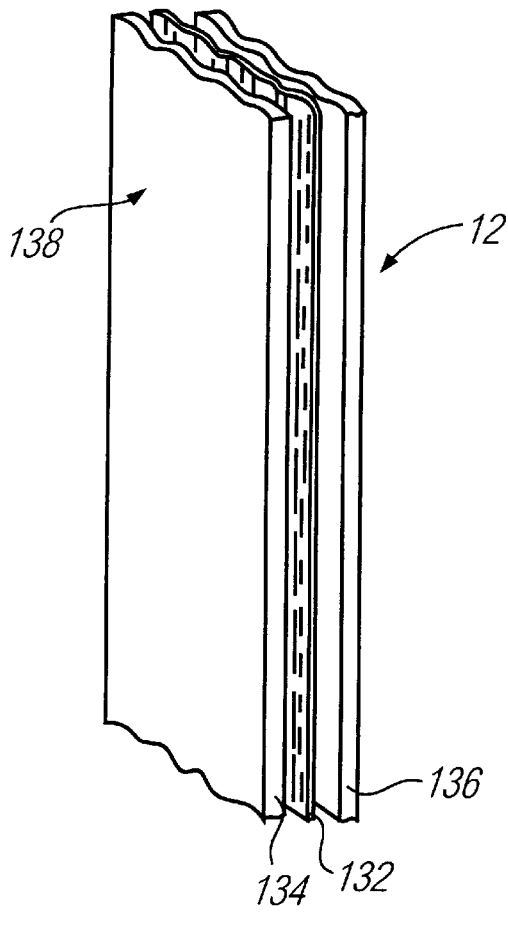
FIGS. 5A, 5B and 5C show methods of constructing the flexible scale.
Figure 5B:
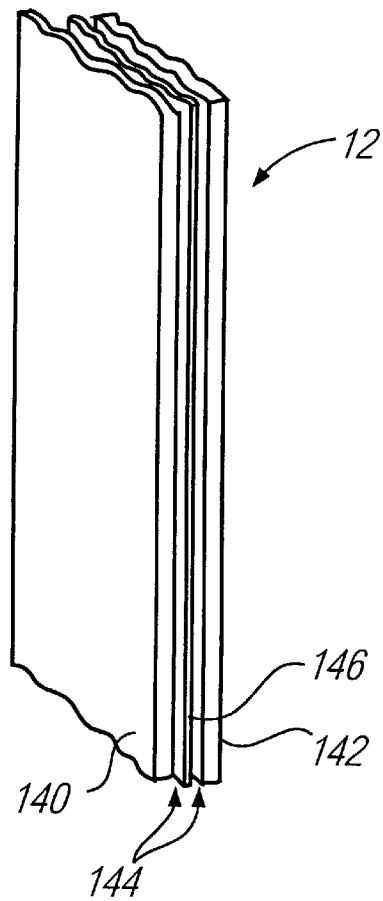
Figure 5C:
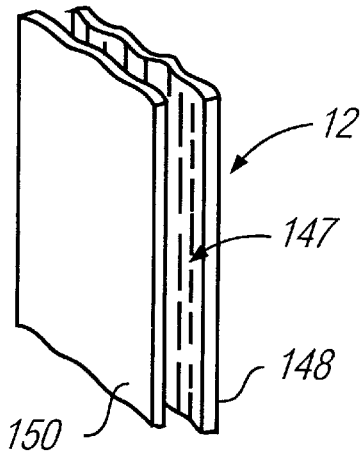

The construction of the scale 12 is illustrated in FIGS. 5A, 5B and 5C. In the scale shown in FIG. 5A, the code is printed on a thin strip of transmissive material 132, which is then sandwiched between layers 134 and 136. Each of the layers 134 and 136 is constructed from cloth (for example, fiberglass or ceramic material), in which is embedded a binding material that also provides adhesion to the transmissive material 132. Fiberglass or ceramic fibers 138 can be embedded into the binding material when added strength is required. The selection and construction of the materials in the scale is done to be compatible with the liquid and so as to retain a transmissive property of the scale for light passage when light is used as the radiated and detected energy. The use of light is preferred. Methods of construction of a scale with areas that are transmissive and opaque to other forms of energy will be apparent to those skilled in the art.

FIG. 5B illustrates another construction of a scale for use with light, again using two layers, 140 and 142 of transmissive material similar to FIG. 5A except constructed from a material such as polyvinyl. Layers 140 and 142 are then attached with glue 144 to the strip 146 upon which is printed the code/scale. The strip 146 can be any transmissive material that is compatible with the liquid to be measured, e.g., polyvinyl or acetate. The layers 140 and 142 can also be ultrasonically or pressure welded.

FIG. 5C shows another scale construction wherein a code 147 is printed on one layer 148 and a second layer 150 is glazed, epoxied, or welded over the printed side of layer 148.

Figures 6A, 6B:
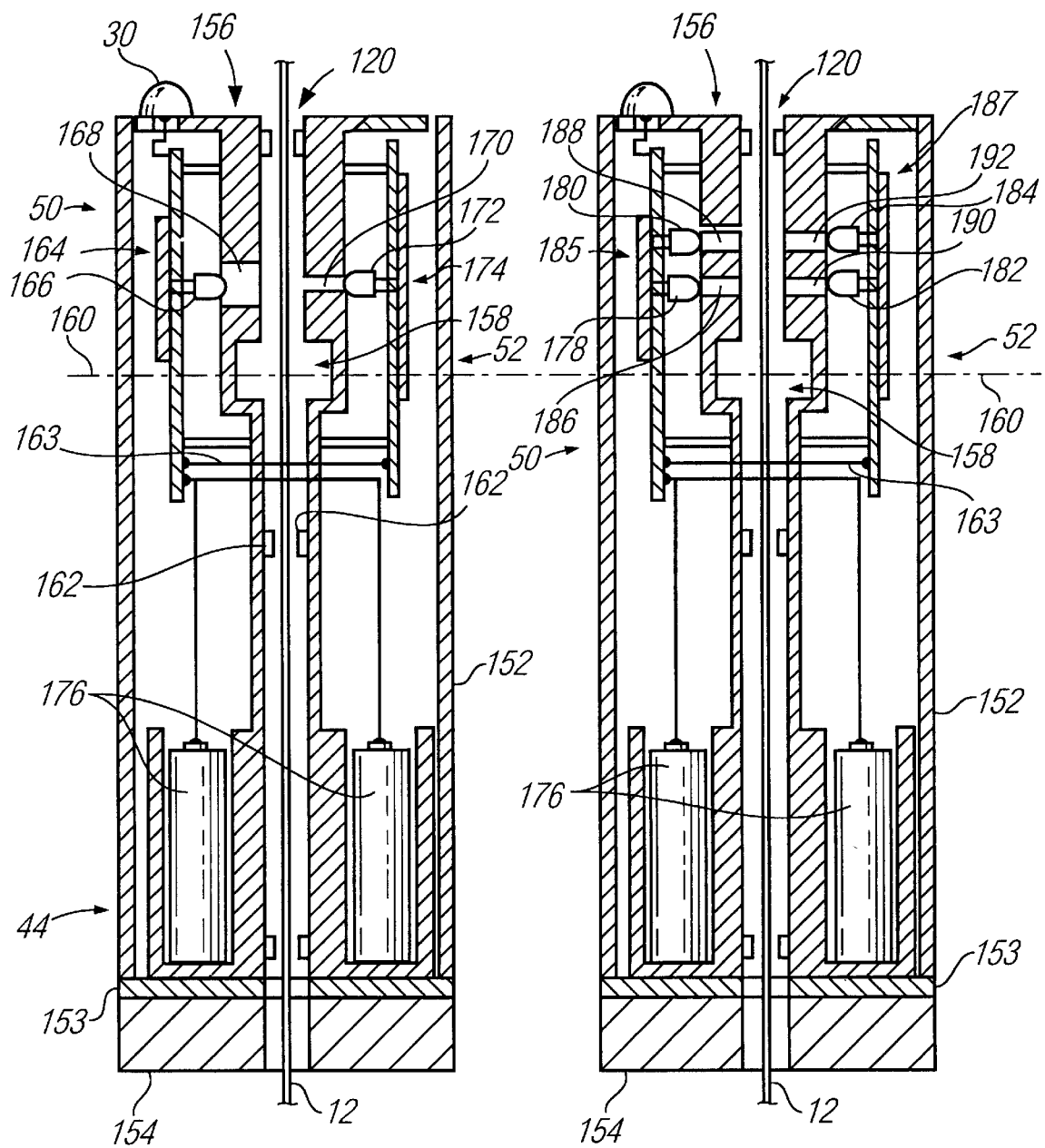
FIGS. 6A and 6B show the arrangement of the emitters and detectors, and other features in the float design.

Referring to FIGS. 6A and 6B there are shown two cross sectional views 149 (see FIG. 1A) of the float 32. For clarity, only selected features are illustrated, omitting construction details that will either be more fully described in the following text referring to the corresponding figures of the drawing, or that will be apparent to those skilled in the art. The float 32 includes a casing 152 most typically cylindrical in shape, with an end cap 153 and a buoyancy adjustment device (ballast) 154 attached as required or as an integral part of the end cap 153. The housing 156 is inserted in the casing, upon which are mounted the various operational parts. The housing 156 includes the slot 120 extending therethrough for passage of the scale 12. An enlarged region 158 having a wider slot gap is shown as a preferred construction, the purpose being to provide more space between the scale 12 and the housing 156 in the region near the liquid level line 160 to avoid or minimize surface tension effects which may impede the free motion of the float 32. In addition to the enlarged region 158 discussed above, friction between the scale and the housing is further reduced in the case when the liquid wets the scale or flat wall above the liquid surface through use of small anti-adhesion stand-offs 162, which provide a small surface area guide to the scale 12, effectively reducing the wetted contact area. Any surface tension effects in this area would be confined to the standoffs and not the entire walls of the slot 120. The standoffs located below the liquid surface generally keep the scale centered in the slot.

Side 50 of housing 156 contains the transmitter circuitry 164 including light emitters 166. The view of FIG. 6A only shows one emitter 166 and one detector 172 because the others are all in line with the one shown. The emitter 166 is shown protruding and sealed into an emitter opening 168 in the housing 156. The detector openings 170, 190, 192 should be smaller than the resolution of the coded tape/scale. The emitters and detectors can also be covered with a transmissive material to keep out liquid. The radiated energy then passes through sealed openings 168 and through the transmissive areas on the scale 12, and through apertures 170 (again, sealed for moisture with a transmissive material) to detectors 172 which provide signals to circuitry 174, which in turn drive the link emitter/transmitter 30 to radiate the measurement signal to the receiving unit 26 of FIG. 1A.

A further alternative includes apertures 168 and 170 with built-in lenses to focus the light on the proper areas of the scale and into the detectors. Lenses can also be built into a transmissive covering. Batteries 176 are used to supply operating power to circuitry 164 and 174, and preferably are positioned in the lower portion 44 to lower the center of gravity of the float.

The float 32 of FIG. 6B is similar to the float of FIG. 6A except that both the emitters and detectors are arranged in two rows (178, 180 and 182, 184) of 6 emitters/detectors per row, instead of the 12 emitters/detectors that are required in the single row of detectors/emitters of FIG. 6A. The two rows of emitters of FIG. 6B are shown positioned in two corresponding rows of holes (186 and 188), and the two rows of detectors are shown positioned behind two corresponding rows of apertures (190 and 192). It should also be noted that the number of emitters and detectors and corresponding rows is a matter of design choice based on a number of factors including the number of bits required according to the accuracy needed. The use of the 12 bit scale of FIGS. 3A and 3B. A single row of twelve emitters and a single row of 12 detectors is used with the twelve bit scale of FIGS. 3A and 3B. Two rows of six emitters each, and two corresponding rows of six detectors each are used with the scale of FIG. C with every other column shifted vertically. The advantage of using two rows of emitters and detectors is that the width of the columns can be made wider for more robust operation, while still maintaining a reduced width of the tape and reduced circumference of the float without necessitating a corollary reduction in the size of the emitters and detectors, or for allowing the use of a given set of emitters and detectors. The emitters and detectors specifically shown in the figures of the drawing are for radiation and detection of light, preferably using LED's for light generation, according to the preferred embodiment of the present invention. Other emitter and detector designs are possible. The many ways of generating radiated energy and detecting it through the scale 12 will be apparent to those skilled in the art after reading the disclosure of the present invention, and these are included in the spirit of the present invention. For example, other types of radiated energy that are included in the present invention are sound, magnetic, electric and electromagnetic fields, and heat.

In operation according to FIG. 6B, the vertical position of the float 32 with respect to the scale 12 is determined by transmission of light energy through the coded scale 12 using a light emitting array of emitters 178 and 180 on one side 50 of the scale 12 and a light detecting array 182 and 184 on the other side 52 of the coded scale 12. The use of two rows of optical emitter/detector pairs in the preferred embodiment, with each row reading 6 bits of the 12 bit number, insure that the diameter of the float is small enough to fit into a 2-in. diameter opening of the underground storage tank. A single row of optical emitter/detector pairs in a 12-bit system implemented with the available inexpensive optical components would result in a float diameter that is too large to fit through a 2-in. diameter opening of a liquid container. Any type of light can be used in the optical emitter, such as visible, infra-red (IR) UV, etc., although visible or IR light is preferred for most applications. The selection of the type of light depends on performance and component price tradeoffs.

For functional robustness, the circuits 164 and 174 of FIG. 6A or 185 and 187 of FIG. 6B operate to cause each bit in the optical code to be read serially by individually cycling through each emitter/detector pair one pair at a time. For electronic simplicity, each coded number read by the detector is then immediately transmitted by an IR data link emitter 30 to the receiver 26 for processing and display, and/or for transmission to a remote display unit for processing and/or display of the liquid level. It is not essential that the data be read serially, and alternative methods as will be apparent to those skilled in the art are included in the spirit of the present invention.

The above description of the preferred embodiment places the emitters and detectors above the liquid-air interface. Although this is preferred, placing the emitters and detectors below the liquid-air interface is also included in the spirit of the present invention. In fact, this is required for the float used to measure the level of a liquid-liquid interface.

Referring now to FIG. 7, a preferred embodiment of housing 156 is shown, less the circuitry 164 and 174, and other components. Circuit board mounting holes and other miscellaneous details are omitted for clarity in illustrating the housing, but will be understood by those skilled in the art. The figure is given in order to more clearly illustrate the holes 186 and 188 through which the emitters radiate the light, and the apertures 190 and 192 behind which are positioned the detectors (182 and 184). The resolution of the system is determined in part by the vertical dimension 196 of the apertures/slits (190 and 192). Locating the detectors behind the narrow, slit-shaped apertures is a very simple way of achieving a high level of resolution without using a lens. The optical detectors could also be mounted in the slits themselves. However, if this is done with improper focussing of the transmitted and received light, it would decrease the effective resolution of the system, would increase the number of reading errors, and might require a wider spacing or additional rows of emitter/detector pairs to function properly.

FIG. 7 also shows space 198 for the batteries 176. The housing 156 is separated into two halves (202,204) in the figure so as to more clearly display the slits/apertures (190,192).

The assembly of the various parts of the float 32 is further clarified in FIG. 8 showing the casing 152 with the optional ballast 154 and casing end cap 153 in place, attached by any of a number of methods known to those skilled in the art, such as with epoxy or by welding. The assembly 210 is to be assembled in the case 152, as indicated by the lines 212 and includes the housing 156, circuitry 164 and 174, the wires 163 connecting the electronics on both side of the float, batteries 176, and various detail parts previously illustrated, as well as other parts that will be apparent to those skilled in the art. The various seams are all sealed to keep liquid out of the interior of the float to protect the operational parts and to retain the float buoyancy. Examples of seams that require sealing are the seam between the rim 216 of assembly 210 and the casing 152, occurring when the assembly 210 is installed in the casing 152. Methods of sealing the various joints include epoxy and welding. Transmissive covers/seals are also used to seal the apertures/slits 190, 192 and holes 186, 188 (see FIG. 7) to exclude liquid from the circuitry and float interior.

The float electronics illustrated in FIGS. 6 and 8 of the preferred embodiment is functionally illustrated in FIG. 9, and is comprised of a time base generator/oscillator 218 and a sequence generator 220 to develop a signal for transmission through the array 222 of photo emitters, including the emitters such as 166 of FIG. 6A or 178 and 180 of FIG. 6B. The emitted light then passes through the transmissive areas of code on the scale 12 and is detected by the photo detector array 224, which would include for example, detectors 172 of FIG. 6A or detectors 182 and 184 of FIG. 6B. These detected signals are then passed to a data symbol assembly logic circuit 226. Line 228 passes synchronization/start-stop signals from the sequence generator 220 to the logic circuit 226, resulting in circuit 226 passing a binary signal to the data link transmitter 230. The transmitter 230 includes a driver 232 which provides the required drive signal to the emitter 30 which radiates a signal 233 carrying the liquid level measurement data to the receiver 26 as illustrated in FIG. 1A. In the preferred embodiment, the radiated signal is a an infra-red carrier containing the data in serial form. Two 1.5 volt, AA size batteries, or other alternative batteries or power sources, are indicated by power supply 234 providing voltage to power the circuitry. The interconnections are not shown.

The preferred embodiment illustrated in FIG. 9 can be implemented using either discrete logic or a microcontroller. However, there are a number of advantages to a microcontroller-based system in terms of cost, functionality, and capability. The cost of the electronic package is less using a microcontroller. Also, the weight of the electronic package is less in the microcontroller, which means that a shorter or more stable float can be made. The microcontroller has the advantage of a built in memory, and also allows for additional capabilities to be added to the float. Finally, and most importantly, the microcontroller will draw significantly less power than discrete logic, and the life of the battery will increase accordingly.

FIG. 9 also illustrates some additional capabilities that may be added to the float sensor system to address the specifics of the measurement application. These are indicated by the dash-lined blocks and dash-lined interconnections. In some applications, it might be necessary to sample and store the level readings in a memory 236 without immediately transferring them to another electronic unit. In other applications, it might be desirable to sample the level on a predetermined schedule and store the level readings in memory 236 for data transfer at a later time. In both applications, the data stored can be uploaded on a predetermined schedule. In other applications, it might be desirable to process the raw level signal data before storing or transferring the data to another electronic unit. The addition of a sleep mode timer 238 in FIG. 9 increases the life of the batteries in the float, because the electronic package is turned off between samples. If required, the time base generator 218 can be set to sample the liquid level data on a predetermined schedule (e.g., once per hour, twice a day, etc.). As used in the preferred embodiment, the level data are sampled continuously at the largest time interval that meets the need of the application. Depending on the application needs, other sensors, such as a temperature sensor or a water level sensor might be added to the float. For underground fuel storage tank applications, one or more floats (sensors) might be added to the system to measure the presence of water at the bottom of the tank.

The same system used to measure the level of a liquid air boundary can be used to measure the interface between two immiscible liquids such as that produced by petroleum fuel and water. This was mentioned in reference to FIG. 1C, and is accomplished by suitably adjusting the buoyancy of the float to ride on the interface of the two liquids. Except for the buoyancy of the float, the same float sensor system used to measure the level of the liquid air boundaries can be used for measurement of the boundary between two immiscible liquids. The geometry of the bottom float can be changed if the level of the liquid air surface needs to be measured down to a depth which is less than the vertical dimensions of the two floats. For example, the bottom float can be made to allow clearance for the bottom of the top float to pass into the top of the bottom float (i.e., a donut design).

In applications where both a liquid-air float and an interface float are used simultaneously, the measurement signal from the interface float can be passed up to the liquid-air float using an IR (or other types of optical) data-link. This is accomplished by adding an IR data link receiver to the liquid-air surface float to receive and relay the level measurement signal from the interface float to the topside electronics. While it is not desirable to use any wires or fiber optic cables to relay any signals from the float to the surface electronics, such an implementation would not be a problem for an interface sensor (e.g., with bottom float/sensor in an underground storage tank) that is intended to travel only a small range (several inches).

Surface tension can affect the response and vertical movement of any float system at any interface, but particularly at the air-liquid interface. Any liquid that is trapped between the slot and the coded scale could retard the vertical movement of the float. Error due to surface tension is minimized in the present invention to a fraction of the basic resolution of the system. As was illustrated in FIGS. 6A, 6B and 7, a larger spacing 158 is provided in the slot opening 120 in the float 32 between the vertical scale and the float in the region around the liquid-air interface. The spacing 158 is large enough to reduce the affects of surface tension to a negligible amount. The liquid level is shown as line 160 in FIGS. 6A and 6B, illustrating the larger spacing 158 primarily in the portion of the float that is at the liquid level 242. Second, as illustrated in FIGS. 6A, 6B and 7, anti-adhesion standoffs 162 are used to minimize the possibility of surface tension effects developing if the coded scale or float becomes wetted during operation. The use of these standoffs tends to keep the scale away from the sides of the slot, but more importantly they are the focal point for any surface tension effects that might develop. If the tape is wetted during the addition of liquid to the container or from condensation, all of the liquid and surface tension affects focus around the standoffs 162, which are small enough to prevent the effects from becoming large. Third, maintaining the vertical alignment of the float relative to the coded scale also minimizes the chance of an unwanted interface developing between the scale/tape and the slot located near the top of the float due to residual liquid on the scale. This is done by making sure the scale is relatively vertical and the center of gravity on the float is below the center of buoyancy. This can be accomplished in a number of ways, such as adding the ballast 154 shown in FIG. 8 and FIGS. 6A and 6B.

The receiver 26 shown in FIG. 1A will now be described in further detail in reference to the functional block diagram shown in FIG. 10. For ease of discussion, the combination shown in FIG. 10 will be referred to as a liquid level signal processing unit 244. Block 246 of the unit 244 represents the use of the detector 28 for detecting the radiated signal 233. Amplification of the detected signal is indicated by amplifier 248.

The signal 233 sent by emitter 30 on the float to detector 28, contains a code that is preferably transmitted as two 8-bit byte words. Twelve of the bits are used to position the float. One bit on each 8-bit byte word is used to identify which word is being received. The remaining two bits can be used for other purposes. For example, one of the bits could be used to determine if the battery power is low.

A unique aspect of the preferred embodiment of the present invention is that no processing of the liquid level signal needs to be done in the float. Every time the code on the scale 12 is read, it is passed serially to the unit 244 for processing. This greatly simplifies the electronics and power requirements in the float 32.

The signal sent by the float 32 is preferably a narrow-beam IR signal, used to transmit the data to the processor unit 244. In general, any type of data link/signal can be used, but an infrared link is preferred for most applications. A physical connection, consisting of wires or fiber optic cables, between the float and the unit 244 could be used, but a physical connection could interfere with operation of the float and therefore, degrade performance or even mechanically foul the system. Radio links and other types of remote communication (e.g., acoustic communication) could also be used, but not as robustly or as inexpensively. These alternative signal types are included in the spirit of the present invention.

The detected signal from block 246, is sent to a receiver/decoder/display driver unit 252. The function of unit 252 depends to a degree on whether a display of liquid level is to be included at or near the liquid container. If so, the unit can contain signal processing to provide display drive signals for direct connection to a display unit 254. Optionally, if the display is remotely located from the liquid container, as shown in FIG. 2, unit 252 provides drive signals for a second emitter 36 for radiating a signal 256 to a remotely located detector 100 of display unit 96 as illustrated in FIG. 2. The optional memory 258 is used to temporarily store the level data for down-loading at a later time. Additionally, or alternatively, signals can be provided for transmission to cable 98 (FIG. 2), through a connector to a cable, or directly to a wire/cable 262 to a remote display.

In the event that the float 32 is designed with the optional memory 236 (FIG. 9), the data stored therein can be retrieved by sending a data retrieve command signal 263 via an emitter 264 (FIG. 10) to detector 266 on the float. Detector 266 is noted as an optional dashed-lined element/block in FIG. 9, and is for detecting and sending the command signal to the logic unit 226. In such a design, the unit 226 would contain circuitry for directing the transfer of the data in memory 236 to unit 244 of receiver 26. The unit 244 can be battery operated, or can operate using wall power. At a minimum, the processing done by unit 244 includes a look-up table to convert the detected liquid level measurement data in the form of raw signal bits, to engineering units, and a means for storage, communication or display of the number. A timer clock 268 that records time and date may be added to the unit 252 illustrated in FIG. 10 to register the level readings being stored. A data port 270 could also be included in the topside electronics package for communication to a computer or other processor for other processing and clock registration. This could be done via an electronic or fiber optic cable or via another optical link. In some applications, such as those at fuel service stations that already have an electronic controller and processor and display units, the unit 244 could be configured to communicate the raw level-signal data or processed level data directly to the controller. Unit 244 can also be configured to send a data request signal via emitter 264 (FIG. 10) to detectors 266 (FIG. 9) to request the taking of a measurement. In this case, logic block 226 could instruct the sequence generator 220 via line/bus 228 to activate the transmitter, i.e., emitter array 222.

A simple form of the processor unit 244 includes only the IR detection/receiver block 246 and the required processing to provide a second drive signal to a second emitter 36, which relays the serial signal 233 to another electronic processor with an IR receiver such as a personal digital assistance, a notebook computer, or a specially designed processor and display unit (which may be very similar or even identical to the one illustrated in FIG. 10). Such an approach has applications in which the entire level measurement system must be installed inside the containment system (e.g., underground fuel storage tanks).

In applying this simple form of the system to an underground storage tank such as those found at a retail service station, the optical emitter 36 could be located on the fill tube, a specially designed fill tube cap, any location in the manway, in the manway cover, or a special hole from the manway to the surface. The most suitable location depends upon the operational needs. This permits level readings to be made with a portable unit or with a permanent unit in line of sight with the optical emitter without opening the tank. For conventional inventory data measurements, this has significant convenience, accuracy and safety advantages.

Particular physical embodiments of the invention dealing with the configuration and position of the processing unit 244 are shown in FIGS. 11A–11D. Each of the figures shows the top portion 274 of a liquid container having a fill tube 276 with a fill cap 278 placed thereon. The fill tube cap is protected by an access container 280 having an access cover 282. In each of these embodiments, (FIGS. 11A–11D) the unit 244 is positioned in the fill tube 276, suspended therefrom by supports 284. The figures also show the scale 12 and detector 28. The unit 24 could also be located in the fill tube cap and also separated from the scale suspended from another portion of the fill tube.

Figures 11A, 11B:
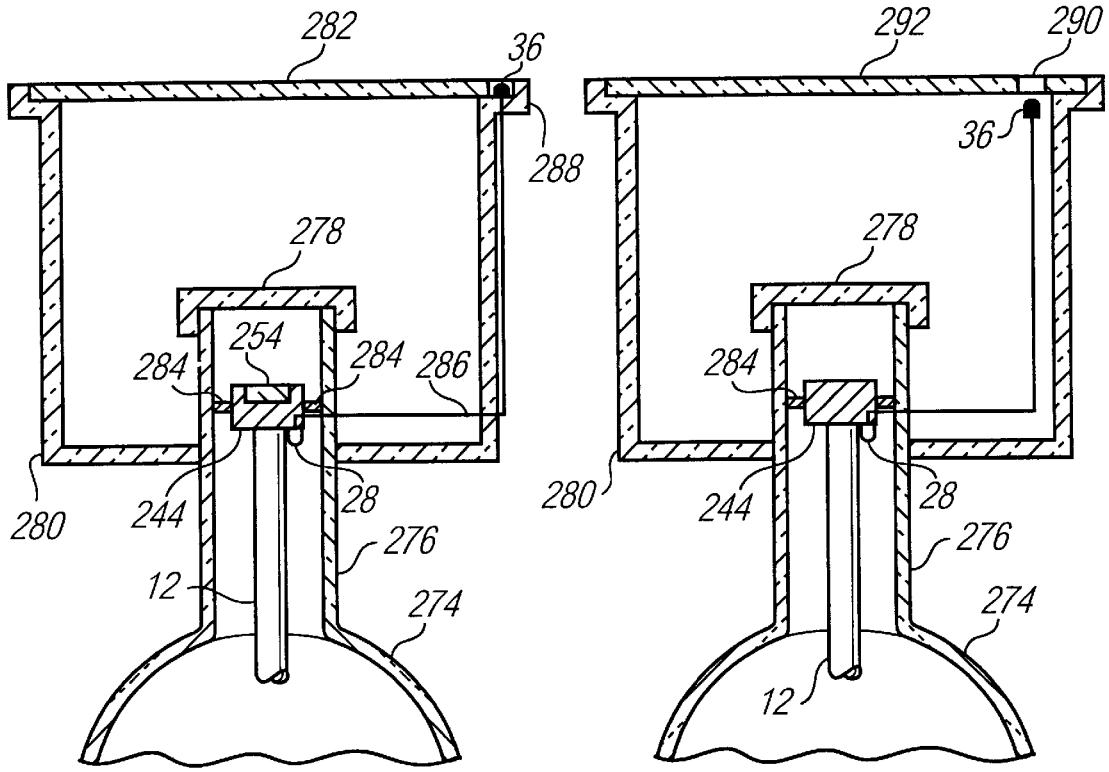

The embodiment of FIG. 11A indicates the provision of a liquid level display 254 on the top side of the unit 244. A line 286 is shown leading to the second emitter 36, for the purpose of radiating a signal containing the liquid level data to a remote location as discussed above in reference to FIG. 10. The second emitter 36 is positioned in the rim 288 of the access container 280 for sending the data to a hand held or remote receiver and display unit that receives the radiated signal from emitter 36.

Figures 11C, 11D:
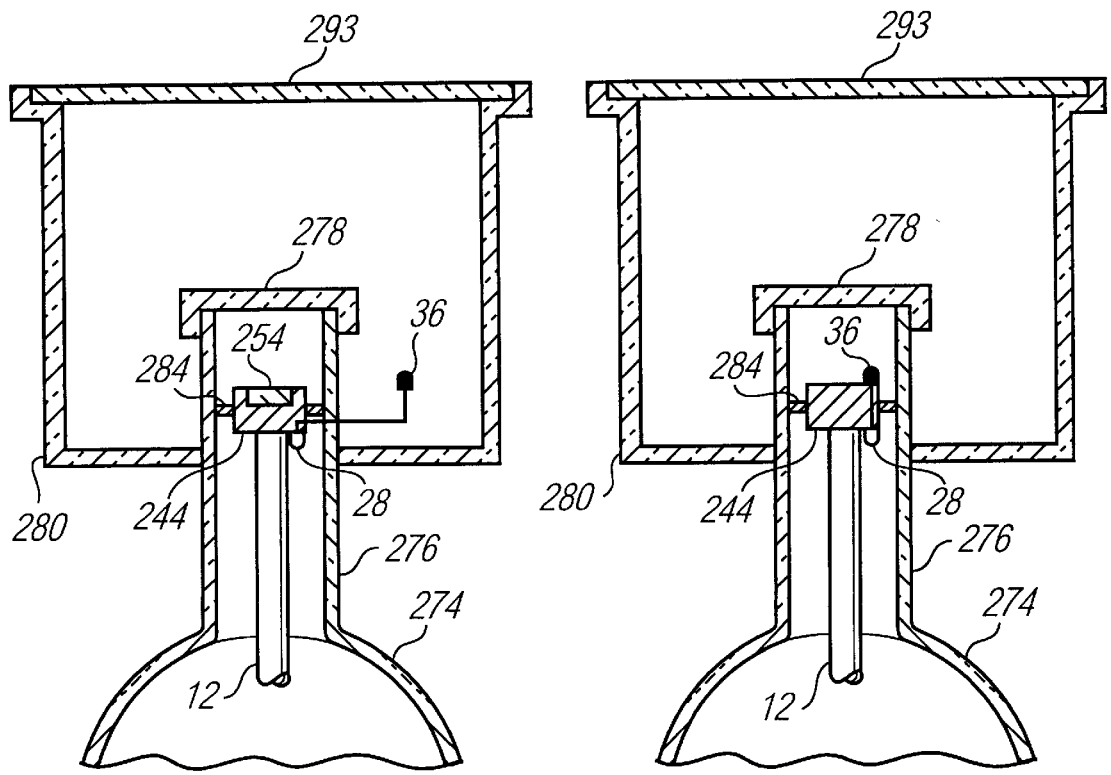

In FIG. 11B, no display unit 254 is shown, and a second emitter 36 is illustrated positioned below a transmissive window 290 in an access cover 292. FIG. 11C shows the second emitter 36 located just outside of the fill tube 276. FIG. 11D shows the second emitter 36 mounted on top of the unit 244 inside of the fill tube. In this case, both the fill cap 278 and cover 282 need to be removed to receive the radiated signal from emitter 36.

There are many ways to install or mount the liquid level measurement apparatus. The particular method of mounting will depend on the specific measurement application. The assembled scale 12, weighted or attached to the bottom of a container, regardless of construction, must have sufficient stiffness to allow the float to move freely up and down the scale. As an alternative to a flexible scale held down or attached to the bottom of the container, the scale can be incorporated into a rigid frame or stretcher system to assure vertical alignment.

In a petroleum storage tank, the vertical scale can be suspended directly from the top of the tank in the fill tube opening as in FIGS. 11A–11D, or in a special opening as shown in FIG. 1A. Mounting the scale through the fill tube is okay for inventory level measurements, because the thermal expansion or contraction of the fill tube and tank is small in comparison to the accuracy of the level measurements. The tape can be weighted at the bottom and suspended freely. FIGS. 12A–12F illustrate six structures for use in suspending the scale. The structures of FIGS. 12A, 12B, 12C and 12F are particularly useful because they attach the scale to the bottom of the container in a flexible manner and tight tolerances are not required. FIG. 12A shows a scale 12 freely suspended with a weight 294 attached; FIG. 12F adds a weight guide to keep the scale in a known location. The scale can also be anchored to the bottom of the tank by a weight 296 (FIG. 12D), but this requires tight tolerancing of the tape length, and it does not provide stress relief. FIG. 12E shows the scale 12 with a magnet 298 attached for retaining it to a base weight 296, or to another magnet or magnetic material 300, if the base 296 is non-magnetic.

If the tape is installed in the fill tube of an underground storage tank, a special anchoring system, which allows the tape to move independently of the weight when an external force is applied, is preferred to prevent movement of the anchor weight or magnet during filling operations. A simple resilient means of connecting and tensioning the scale to the weight would relieve the stress on the tape and weight. Such a connection and tensioning system is also advantageous in the case when the tape is permanently attached to the bottom of the tank. In its simplest form, a suspended tape 12 with enough weight 299 attached to assure that the tape hangs vertically under normal level measurement operations, can be connected by various types of resistant devices 302 to a permanent anchor 304 resting on the bottom 305 of the tank, as in FIGS. 12B and 12C. Other flexible attachment devices can also be used which allow movement of the tape during application of external forces without movement of the anchor. FIG. 12F shows a preferred embodiment for flexibly locating and retaining the scale to the bottom of a container. The embodiment consists of a heavy base 306 with a slot 308 in the top, through which the scale 12 can fit. A weight 310 is attached to the bottom of the scale 12, and is of dimensions disallowing its passage through the slot 308. This system provides flexible retainment of the scale 12, allowing stress relief for the scale when it is subjected to forces, such as occurring when liquids are deposited in the container, etc.

For some applications, a rigid scale, which rests on the bottom of the container might better be used than a flexible or suspended scale. In such a case, if the vertical scale is a flexible tape it can be mounted in a rigid frame or stretcher. A rigid frame or stretch frame might also be used to insure that a flexible tape hangs straight and does not twist.

Figure 13A:
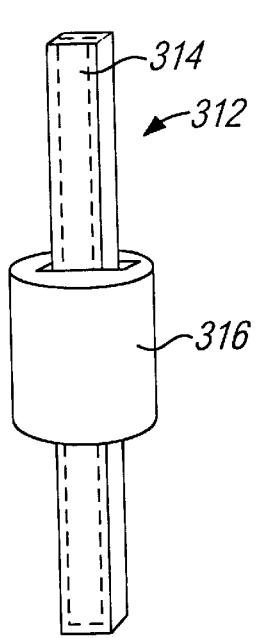
Figure 13B:
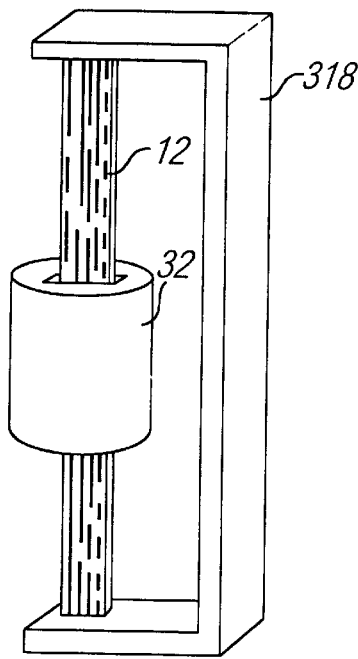
Figure 13C:
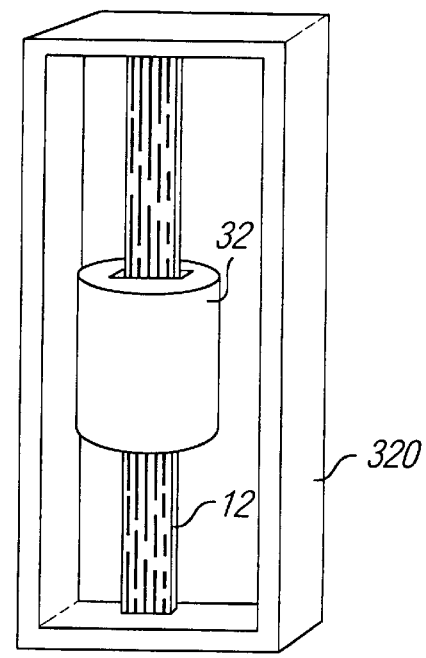
Figure 13D:
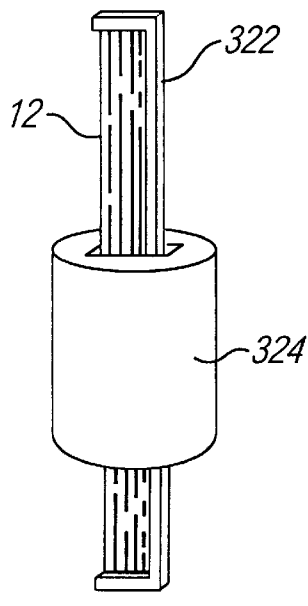
Figure 13E:
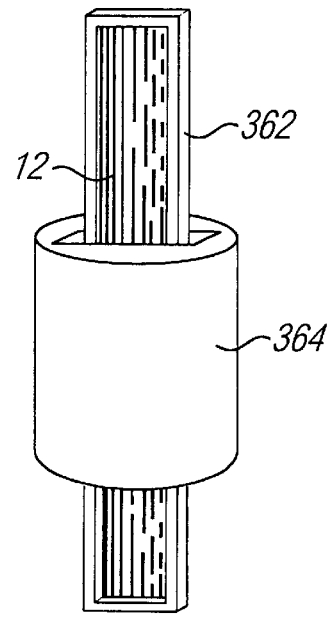

FIGS. 13A–13E illustrate examples of rigid frames that can be used to provide support to a flexible vertical scale when required. FIG. 13A shows a scale 312 in the form of a rigid translucent block of material formed around a coded scale 314. The scale 312 passes through a float 316. FIG. 13B shows a rigid elongated U shaped frame 318 supporting the scale 12, with the float 32 in place. FIG. 13C shows a rectangular frame 320 supporting the scale 12 with the float 32 in place. FIG. 13D shows a U shaped frame 322 in close proximity to the scale 12, directly supporting it on three sides, configured for passage through a float 324. FIG. 13E shows a rectangular frame 362 supporting scale 12, passing through a float 364.

The accuracy of the liquid level measurement depends on a variety of parameters. A brief description of some of the more important sources of error that might affect the accuracy of the level readings is discussed below. For most applications, the required accuracy is easy to achieve. The first two sources of error concern the code, and the operation of reading the code. The remaining four sources of error concern a variety of configuration, mounting, physical and calibration sources of error.

First, the accuracy of the level measurement made with the present invention depends on the resolution of the optical code. The resolution of the code is established mainly by the length and width of the slits used to receive the light, but also by the size of the optical emitters and detectors and the spreading of the light between the slits, which is controlled by the beam width of the optical emitters being used, the distance between the optical emitters and detectors, and the slit dimensions. The current apparatus is built with a resolution of better than a $\frac{1}{16}$ in., (i.e., 0.05 in.) which is achieved using a 12-bit Gray code to measure level changes over a 17-ft. range. A resolution of $\frac{1}{64}$ to $\frac{1}{32}$ in. or better, could easily be achieved with the current apparatus without much risk of reading errors or loss of precision.

Second, reading errors could occur if more than one element of the code, either in the vertical or horizontal, is incorrectly illuminated or blocked, or if the transmitted power of the optical emitter is too weak to be reliably detected by the optical detector. Simultaneous illumination might occur if the resolution of the code is too small, or if the "opaque", areas leak light or do not adequately block the slits. Inadequate illumination might occur if the distance between the optical emitters and detectors is too large, the optical scale is not translucent, or the output of the optical emitter is too weak. None of these errors are significant in the preferred embodiment. Proper design and construction minimizes these types of errors.

Third, the accuracy of the apparatus is controlled by surface tension effects that might develop between the scale and the float at the liquid-air interface (i.e., liquid surface) and above the air-liquid interface from any residual wetting of the tape as the float moves up and down with the liquid. Surface tension effects have been specifically addressed in the float design to insure that the effects are less than the resolution of the scale.

Fourth, the accuracy of the apparatus might also be affected by surface tension attraction between the float and container, if the float diameter is too large. This effect can be minimized by insuring that the distance between the wall of the float and the wall of the container is large enough. For most applications of the present invention, this is not a problem.

Fifth, the accuracy of the apparatus is dependent upon the scale hanging vertically and not moving horizontally during the measurement. Thermal expansion/contraction of the scale and float does not introduce significant errors for most inventory applications. With careful installation, errors introduced by flexible scale movement are small compared to the resolution of the apparatus and can be further minimized by averaging the level data.

Sixth, the accuracy of the apparatus is dependent upon the calibration of the system. Since the code is marked on the vertical measurement scale as if it were a ruler, the main source of calibration error is any error that occurs in the elevation offset that needs to be measured between the liquid surface reference elevation of the scale and the bottom of the container. This offset is measured when the scale is installed.

The above discussed sources of error can be easily overcome to the extent needed to meet the desired accuracy of most inventory liquid-level measurements, which is generally 1/8 in. and no more stringent than a 1/16 or 1/32 in.

FIG. 14 illustrates an alternative embodiment of the present invention where the function of the emitters in the float 365 is performed by background illumination. FIG. 14 shows the use of one or more light sources 366 positioned in a cavity 368 of the float 365 for simultaneous transmission of energy through one or more rows of apertures/slits 370, through the scale 12 and apertures 369 to detectors 371. This type of parallel or simultaneous illumination can be accomplished by either continuous illumination or by periodically turning the illumination on and off. Small lenses could be added to each of the slits to better focus the light beam at each slit.

FIG. 15 is a cross sectional view illustrating another alternative embodiment of the present invention. In this embodiment, an emitter is not present in the float 372. Instead, an emitter 374 is placed in a compartment 376 adjacent and attached to the vertical scale 378. The emitters 374 are behind the coded scale 378 and extend from the top to the bottom of the scale. Energy is transmitted through the scale 378 and is received by the array of detectors 382 on the float 372. In this embodiment, the entire coded scale is illuminated with a source of energy located in the vertical compartment 376 behind the coded scale 378. As described above, the source of background illumination can be operated continuously or periodically turned on and off. Another embodiment is shown in FIG. 16. This is similar to the embodiment of FIG. 15 except that the single large compartment 376 of FIG. 15 is divided into a plurality of separate compartments 384, each with its own emitter 386. The purpose of the separate compartments is to minimize the extent of the scale 378 illuminated at one time.

A further embodiment of the present invention is shown in FIG. 17 wherein two coded scales 388 and 390 are provided, with two sets of detectors 392 and 394, one for each of the two scales. Light sources 400 are provided in a central compartment 396 between the two scales. The compartment 396 can, for example, be an elongated rectangular frame 398, the scales 388 and 390 covering the opposing two open sides. Other methods of providing illumination/radiated energy can also be used, such as the compartments and emitters of FIG. 16. The illustration of FIG. 17 showing the use of two scales is given by way of example. Other methods of using more than one scale are also included in the spirit of the present invention. For example, a single, flat tape such as the one depicted in FIGS. 1 and 3 providing a single scale, could instead have two or more scales laid out on a single tape. Separate emitters and detectors would be required for each of the additional scales. The advantage of duplication would be increased reliability through redundancy, and improved accuracy provided by comparing the measurements of the additional scales.

In the above embodiment showing an emitter in a scale container, the source of electrical power can be from outside the liquid container, which conserves the energy of the batteries in the float.

FIG. 18 shows an embodiment of the present invention in which the emitter 402 is located above the liquid level surface and near the top of the liquid container. The energy is transmitted down to the float 404 where it is redirected by a reflecting surface 406 to pass through the transmissive areas/bits of code on the scale 12 to the detector array 408. The detected signal is then processed by processor 410, empowered by a battery supply in the float (not shown), to drive the emitter 412 to radiate the coded signal to the detector 414 of a receiver/transceiver 415, similar to apparatus discussed in reference to FIG. 10. The illumination source 402 is designed to have sufficient beam width to simultaneously illuminate all of the bits of the coded scale that need to be illuminated to measure the position of the float. Alternatively, a highly collimated source of radiation can be used to illuminate each bit of the tape sequentially, but such a system would require a high degree of alignment to work effectively.

FIG. 19 shows an embodiment in which the emitters 416 are located in a float 418, similar to the preferred embodiment of FIG. 1A, except in FIG. 19 a reflector 420 is used to reflect the energy passed by the scale 12 to detectors 422 located above the float 418 and near the top of the liquid container. In this configuration, each emitter 416 would be serially turned on and off, so that each bit could be read by the detectors 422. Providing the emitters and detectors are properly time synchronized, a single detector 422 could be used instead of the full array. Use of a full array requires a high degree of vertical alignment and control of the reflected beam. As with the embodiment shown in FIG. 18, this embodiment also requires a power supply in the float.

FIG. 20 illustrates an embodiment in which both the optical emitters 424 and detectors 426 are located above the float 428 and near the top of the containment system. In this embodiment, reflectors 430 and 432 are used in the float on the emitter side and on the detector side of the optically coded scale 12 and no source of power is required in the float. This embodiment has applications over short ranges where the transmitted or received radiation can be sufficiently collimated and aligned to avoid reading errors. A single emitter 424 can be used to implement this embodiment, but a full detector array 426 is required. This embodiment has the advantage that no power supply is required in the float. However, a high degree of alignment and a narrow beam are required for good performance. All three of the embodiments illustrated in FIG. 18–20 can also be implemented with the emitter and/or detectors located below the liquid surface.

The embodiments illustrated in FIGS. 14–20 preferably use the same optical code as described in FIG. 3, although other codes are also included in the invention.

FIGS. 21–24 show several additional alternative embodiments of the present invention that use vertical arrays of emitters and/or detectors and a very simple coded scale. In FIGS. 21 and 22, optical detectors 434 are located in a housing 436 with a coded scale 438 forming at least part of one side as shown. The float 440 in FIG. 21 contains a horizontal array of emitters 442 for illumination of the scale 438 through aperture 439. In FIG. 22, the illumination is provided by alternate emitter sources 446 in a cavity 448 of the float 450, radiating energy through aperture 451 to the scale 438. In either FIG. 21 or 22, there are a number of types of detector arrays that can be used. One type is a horizontal array of detectors 434 at each vertical position of the coded scale 438. For a 12 bit code, as illustrated by the coded scales in FIG. 3, 12 detectors would be required for each vertical increment. The number of detectors can be greatly reduced by using a single vertical array of detectors 434 to determine the position of the float 440 or 450 relative to the vertical scale. The coded scale 438 can then be simplified to a column of horizontal slits 458, shown in the view 460 of the broad surface of the scale 438. Each slit 458 coincides with one of the detectors 434. The purpose of the slits 458 is to collimate the radiated energy from the emitters 442 or 446 in the float (440 or 450) to the detectors 434 so that only one of the detectors will indicate at a time. The possibility of an error caused by more than one detector being illuminated from background illumination can be minimized further by embedding the detectors in the code, i.e., slits 458 through the code. The slits 458 can be eliminated if they are not required to minimize the background illumination. The signal detected by the particular detector 434 is sent via bus 459 to a receiver-processor 464 which either displays a measurement read-out or relays the measurement data to a remote receiver in a similar manner to that described in reference to FIG. 10.

Referring again specifically to FIG. 21, liquid level measurement will also be possible if the detectors 434 are instead emitters, and the emitters 442 are instead detectors. In either case, the detectors or alternative emitters can be activated by a processor located either in the housing 436 or preferably exterior in a receiver or transceiver 464 with circuitry similar to unit 244 of FIG. 10. In the case where elements 434 are detectors, the circuitry 466 activates emitters 442, and then the processor activates each of the detectors 434 until a signal is detected. The processor 464 then responds by outputting a corresponding vertical position reading by displaying a reading or relaying the data to a remote receiver in the same way as discussed relative to FIG. 10. In the case where the array 434 is emitters and 442 is a detector, the detector is connected so as to output any detected signal to the circuitry 466, which in this case responds to a detected signal by outputting a drive signal to emitter 468, which radiates a signal to detector 470 of receiver/transceiver/processor 464. Processor 464 in this case sequentially activates each of the emitters 434, and when a detected signal via detector 442 is received, outputs a signal indicative of the liquid level measurement corresponding to the particular emitter activated coincident with the detected signal.

FIGS. 23 and 24 illustrate alternatives to the apparatus of FIGS. 21 and 22. The benefit of the embodiments of FIGS. 23 and 24 is a substantial reduction in the number of emitters/detectors required. As shown in the figures, the number of slits 472 in the vertical scale 474 is substantially reduced, and the number of detectors/emitters 476 in the float 478 of FIG. 23, or detectors 480 in FIG. 24 is increased. The number of optical emitters and detectors can be minimized by spacing the slits 472 and their corresponding emitters/detectors 482 of FIG. 23 or compartments 483 with sources 485 of FIG. 24, a distance equal to one resolution cell short of the total number of resolution cells required between each of the emitters/detectors 482 on the vertical scale 474 for FIG. 23, or illumination source slits 472 in FIG. 24. As in the case of FIG. 21, the elements 482 in the scale housing 486 of FIG. 23 can be either emitters or detectors, with the float 478 having either detectors or emitters respectively. The elements 482 are connected to a processor by way of bus 487 similar to 464 of FIG. 21, and the elements 476 in the float are connected to a unit 489 similar to 466 for driving an emitter if elements 476 are emitters. In either case, elements 482 must be sequentially activated at a first rate and elements 476 activated at a second rate greater than the first rate by a factor greater or equal to the number of vertical increments between the slits 472. The processor 464 is designed to sense the position of the element 482 that is detecting and the element 476 that is activated when a signal is detected indicative of transmission between the float and elements 482 or vice versa, and output a corresponding liquid level signal. In the case where elements 476 are detectors, the unit 489 transmits the data by way of emitter 491 to the receiver 464.

In the case of FIG. 24, the housing 484 is divided into the compartments 483, each having sources 485. In this case, the elements 480 must be detectors. The operation works the same as the device of FIG. 23 when elements 482 are emitters.

As mentioned above, one or more additional scales can also be added to the vertical scale of any of the embodiments described above. Also, one or more columns can be added to the coded scale. Both additions can be used to make the position determination, or to reduce the possibility of reading errors, increase the position accuracy, or verify the position measurement already made. In the embodiments of FIGS. 21, 22 and 23, with the emitter in the float, either of the two sources of illumination can be operated continuously or periodically by turning them on and off.

The present invention and all of its embodiments are best implemented using an optical measurement approach. However, with the possible exception of the embodiments in which the emitters or detectors are located near the top of the tank, all of the remaining embodiments can be implemented using other types of emitters (or sources of energy) and detectors and a coded vertical scale that accommodates the transmission of the selected source of energy. By simple analogy, it is possible to show that the embodiments described above can also be implemented using other sensing technologies such as thermal, magnetic, acoustic, resistance, conductivity, and capacitance technologies. The opaque and transmissive parts of the coded scale described above, which blocks transmission of energy and allows transmission of energy through the coded scale, respectively, need only be replaced by the appropriate means to block or allow transmission of energy from the selected energy source. This is a particularly straight forward analogy for the use of acoustic (ultrasonic) transmitters and receivers instead of optical emitters and optical detectors and the use of a coded scale that allows acoustic transmission through the parts of the coded scale (open regions in the tape) and blocks the acoustic transmission by a material that reflects of absorbs acoustic energy. Implementation of these embodiments using magnetic sources and receivers is equally straightforward. These embodiments can also be implemented using a thermal sensing and coded scale system. In this system, the vertical scale consists of coded tape comprised of insulation regions (equivalent to the opaque regions on the optical system) and thermally conductive regions (equivalent to the translucent regions of the optical system) and the sensing array is comprised of a thermal emitting array and a thermal detector array.

Although a preferred embodiment of the present invention has been described above, it will be appreciated that certain alterations and modifications thereof will become apparent to those skilled in the art. It is therefore intended that the appended claims be interpreted as covering all such alterations and modifications as fall within the true spirit and scope of the invention.

What is claimed is:

1. An apparatus for measuring the level of a liquid comprising:
   (a) a flexible vertical measurement scale for measuring the level of a liquid, the scale having a binary code comprised of opaque and transmissive elements along its length indicative of specific levels of the scale, the code implemented such that the code is read by transmission of energy through portions of the code;
   (b) means for mounting the scale in the liquid, with a top end of the scale above the highest liquid level to be measured and a lower end of the scale below the lowest liquid level to be measured; and
   (c) first float designed to float on the liquid, the float unattached to and configured to move freely about the scale, the float including (i) energy transmission means for transmitting energy from a first side of the scale through transmissive portions of the scale, and (ii) energy receiving means on the opposite side of the scale, whereby the code for a specific level of the scale is read.

2. The apparatus of claim 1, wherein the energy transmission means in the float includes emission means for radiating energy from the first side of the scale.

3. The apparatus of claim 1, wherein the energy receiving means in the float includes detection means for reading the code for a specific level of the scale by receiving energy transmitted through the scale.

4. The apparatus of claim 2, wherein the energy receiving means in the float includes detection means for reading the code for a specific level of the scale by receiving energy transmitted through the scale.

5. The apparatus of claim 1, wherein the transmitted energy is light.

6. The apparatus of claim 4, wherein the transmitted energy is light.

7. The apparatus of claim 1, further comprising processing means for determining the level of the liquid from the reading of the code for a specific level of the scale.

8. An apparatus for measuring the level of a liquid comprising:
   (a) a vertical measurement scale, the scale having a binary code comprised of opaque and transmissive bits along its length indicative of specific levels of the scale, the code implemented such that the code is read by transmission of energy through portions of the code;
   (b) a float configured to move freely about the scale, the float including (i) energy transmission means for transmitting energy from a first side of the scale through transmissive portions of the scale, and (ii) energy receiving means on the opposite side of the scale, the energy receiving means including detection means for reading the level code for a specific level of the scale by receiving energy transmitted through the scale; and
   (c) first signal transmission means for wirelessly communicating the level code read by the detection means to a receiver at a location remote from the float.

9. The apparatus of claim 8, wherein the first signal transmission means comprises an optical emitter.

10. The apparatus of claim 8, further comprising processing means for determining the level of the liquid from the reading of the code for a specific level of the scale.

11. The apparatus of claim 10, wherein the processing means is remote from the float and the receiver, and further comprising means for wirelessly communicating the level code from the receiver to the processing means.

12. The apparatus of claim 1, wherein the code is a Gray code.

13. An apparatus for measuring the level of a liquid comprising:
   (a) a vertical measurement scale, the scale having a Gray code comprised of opaque and transmissive bits along its length indicative of specific levels of the scale, the code implemented such that the code is read by transmission of energy through portions of the code, with the code arranged in a manner such that the portions of the code which change most rapidly from row to row are placed near the center of the scale; and
   (b) a float configured to move freely about the scale, the float including (i) energy transmission means for transmitting energy from a first side of the scale through transmissive portions of the scale, and (ii) energy receiving means on the opposite side of the scale, whereby the code for a specific level of the scale is read.

14. An apparatus for measuring the level of a liquid comprising:
   (a) a vertical measurement scale, the scale having a binary code comprised of opaque and transmissive bits along its length indicative of specific levels of the scale, the code implemented such that the code is read by transmission of energy through portions of the code, with the code for a specific level staggered by offsetting bits of the code; and
   (b) a float configured to move freely about the scale, the float including (i) energy transmission means for transmitting energy from a first side of the scale through transmissive portions of the scale, and (ii) energy receiving means on the opposite side of the scale, whereby the code for a specific level of the scale is read.

15. An apparatus for measuring the level of a liquid comprising:
   (a) a vertical measurement scale, the scale having a binary code comprised of opaque and transmissive elements along its length indicative of specific levels of the scale, the code implemented such that the code is read by transmission of energy through portions of the code, and wherein the code is a Gray code, and wherein the Gray code is arranged in a manner such that the elements of the code which change most rapidly from row to row are placed near the center of the scale and wherein the code for a specific level is staggered by offsetting bits of the code; and
   (b) a float unattached to and configured to move freely about the scale, the float including (i) energy transmission means for transmitting energy from a first side of the scale through transmissive portions of the scale, and (ii) energy receiving means on the opposite side of the scale for receiving said energy, whereby the code for a specific level of the scale is read.

16. An apparatus for measuring the level of a liquid comprising:
   (a) a vertical measurement scale, the scale having a Gray code comprised of opaque and transmissive elements along its length indicative of specific levels of the scale, the code implemented such that the code is read by transmission of energy through portions of the code, with the code for a specific level staggered by offsetting bits of the code; and
   (b) a float configured to move freely about the scale, the float including (i) energy transmission means for emitting light energy from a first side of the scale through transmissive portions of the scale, and (ii) energy receiving means on the opposite side of the scale, the energy receiving means including detection means for reading the code for a specific level of the scale by receiving energy transmitted through the scale, whereby the code for a specific level of the scale is read, and wherein the energy transmission means and energy detection means comprise a plurality of rows of optical emitter and detector pairs offset as the code is offset, whereby the offset code for a specific level may be read by the corresponding offset emitter and detector pairs.

17. The apparatus of claim 16, wherein the float further comprises a slit smaller than the resolution of the scale placed between the optical emitter and optical detector in each optical emitter and optical detector pair.

18. An apparatus for measuring the level of a liquid comprising:
   (a) a vertical measurement scale, the scale having a binary code comprised of opaque transmissive bits along its length indicative of specific levels of the scale, the code implemented such that the code is read by transmission of energy through portions of the code; and
   (b) a float configured to move freely about the scale, the float including (i) energy transmission means for transmitting energy from a first side of the scale through transmissive portions of the scale, and (ii) energy receiving means on the opposite side of the scale, whereby the code for a specific level of the scale is read, the float having a slot therethrough with a gap for passage of the scale, with the slot widened to provide an enlargened gap area at the position of the float which will be at the liquid level, whereby surface tension is reduced between the float, scale, and liquid, thereby allowing the float to move more accurately with the liquid level.

19. An apparatus for measuring the level of a liquid comprising:
   (a) a vertical measurement scale, the scale having a binary code comprised of opaque and transmissive bits along its length indicative of specific levels of the scale, the code implemented such that the code is read by transmission of energy through portions of the code; and
   (b) a float configured to move freely about the scale, the float including (i) energy transmission means for transmitting energy from a first side of the scale through transmissive portions of the scale, and (ii) energy receiving means on the opposite side of the scale, whereby the code for a specific level of the scale is read, the float having a slot therethrough with a gap for passage of the scale, wherein anti-adhesion standoffs are positioned along the slot in the area of the float which will be above the liquid level, thereby reducing adhesion between the float and scale due to wetting.

20. The apparatus of claim 1, wherein the means for mounting the scale comprises an anchor below the lower end of the scale for securing the lower end of the scale and maintaining the scale in a vertical position.

21. The apparatus of claim 1, further comprising:
   (a) a second float configured to float on an upper surface of an upper liquid disposed above a lower liquid, said upper liquid and said lower liquid being immisible liquids, and said second float configured to move freely about the scale, and said second float including energy transmission means for transmitting energy from said first side of the scale through said transmissive portions of the scale, and said second float including energy receiving means on said opposite side of the scale for receiving said energy, whereby code for a specific level of the upper surface of the upper liquid is read; and
   (b) said first float is configured to float at an interface between said upper liquid and said lower liquid.

22. An apparatus for measuring the level of a liquid comprising:
   (a) a vertical measurement scale, the scale having a binary code comprised of opaque and transmissive elements along its length indicative of specific levels of the scale, the code implemented such that the code is read by transmission of energy through portions of the code; and
   (b) a float configured to move freely about the scale, the float including (i) energy transmission means for emitting light energy form a first side of the scale through transmissive portions of the scale, and (ii) energy receiving means on the opposite side of the scale, the energy receiving means including detection means in the float for reading the code for a specific level of the scale by receiving energy transmitted through the scale, whereby the code for a specific level of the scale is read, and wherein the energy transmission means comprises background illumination from an emitter, and wherein the float further comprises at least one horizontal row of slits, the slits placed between the transmission means and the detection means, whereby each slit allows passage of light for a specific horizontal position on the scale and each slit is smaller than the resolution of the scale.

23. An apparatus for measuring the level of a liquid comprising:
   (a) a vertical measurement scale, the scale having a binary code comprised of opaque and transmissive elements along its length indicative of specific levels of the scale, the code implemented such that the code is read by transmission of energy through portions of the code; and
   (b) a float configured to move freely about the scale, the float including (i) energy transmission means for transmitting energy form a first side of the scale through transmissive portions of the scale, wherein the transmitted energy is light and wherein the energy transmission means comprises background illumination from within the scale, (ii) energy receiving means on the opposite side of the scale, the energy receiving means including detection means for reading the code for a specific level of the scale by receiving energy transmitted through the scale; and (iii) at least one horizontal row of slits, the slits placed between the transmission means and the energy receiving means whereby each slit allows passage of light for a specific horizontal position in the scale and each slit is smaller than the resolution of the scale.

* * * * *